United States Patent [19]

Morimoto et al.

[11] Patent Number: 5,757,359
[45] Date of Patent: May 26, 1998

[54] VEHICULAR INFORMATION DISPLAY SYSTEM

[75] Inventors: Kyomi Morimoto, Nishio; Akimasa Nanba, Chiryu; Kazuteru Maekawa, Aichi-ken, all of Japan

[73] Assignee: Aisin AW Co., Ltd., Japan

[21] Appl. No.: 364,245

[22] Filed: Dec. 27, 1994

[30] Foreign Application Priority Data

Dec. 27, 1993 [JP] Japan .................. 5-332821
Dec. 27, 1993 [JP] Japan .................. 5-332824

[51] Int. Cl.⁶ .................................. G09G 3/02
[52] U.S. Cl. .......................... 345/156; 345/173
[58] Field of Search ................ 345/199, 156, 345/168, 173; 342/457, 357; 364/449

[56] References Cited

U.S. PATENT DOCUMENTS

| | | | |
|---|---|---|---|
| 4,788,447 | 11/1988 | Kiyono et al. | 307/10.1 |
| 4,980,668 | 12/1990 | Leigh-Monstevens | 340/456 |
| 5,223,844 | 6/1993 | Mansell et al. | 342/357 |
| 5,266,931 | 11/1993 | Tanaka | 345/156 |
| 5,305,014 | 4/1994 | Mutschler et al. | 345/156 |
| 5,459,824 | 10/1995 | Kashiwazaki | 345/199 |
| 5,467,276 | 11/1995 | Tsuyuki | 364/449 |

FOREIGN PATENT DOCUMENTS 0323246  5/1989  European Pat. Off.
0523918  1/1993  European Pat. Off.

Primary Examiner—Mark R. Powell
Assistant Examiner—John Suraci
Attorney, Agent, or Firm—Lorusso & Loud

[57] ABSTRACT

A vehicular navigation system includes a display screen mounted on a vehicle, a run/stop detector for detecting whether the vehicle is running or stopped, a display color controller for changing the colors of the individual picture elements of the displayed picture in accordance with whether the vehicle is running or stopped; an input device for inputting the selection of and instructions for the picture; a picture transition controller for controlling the transition of the picture in accordance with the input instructions and a picture drawing processor for drawing the picture, which is controlled by the picture transition controller, in the colors of the picture elements dictated by the display color controller. The colors of the pictured elements on the display are selectively chosen in accordance with either a detected stop or detected running. A daytime/nighttime decider distinguishes between daytime and nighttime. The display color controller includes a plurality of pallets adapted to be changed in accordance with the detection of either stop or running to control the colors of the individual picture elements of the picture of the display.

6 Claims, 36 Drawing Sheets

FIG.2 (a)
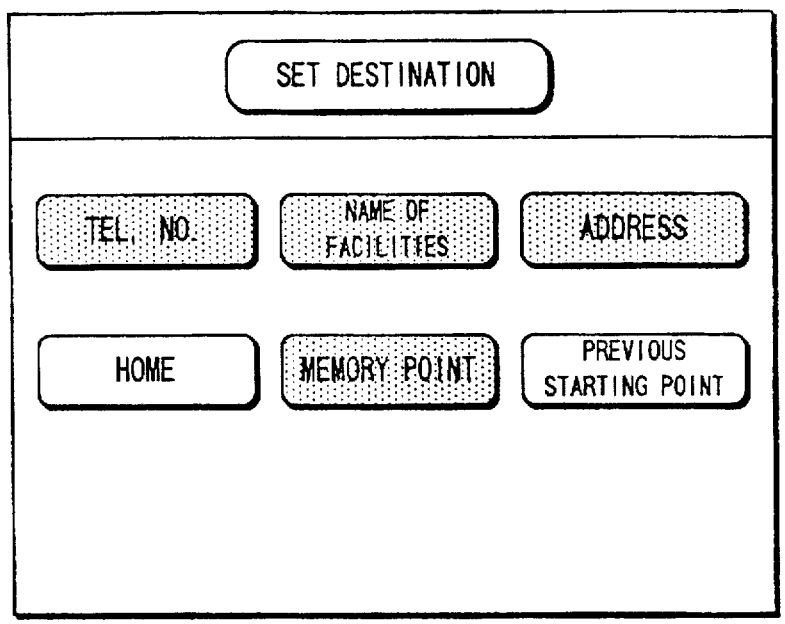
STOP ⬇ ⬆ RUN
FIG.2 (b)
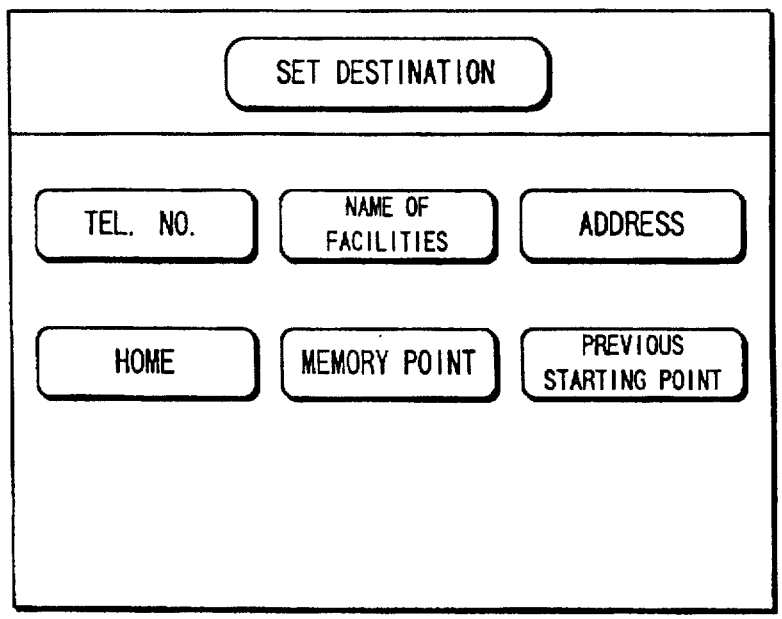
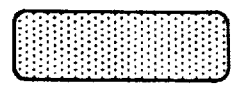 DIFFERENT KEY COLOR

FIG.2 (c)
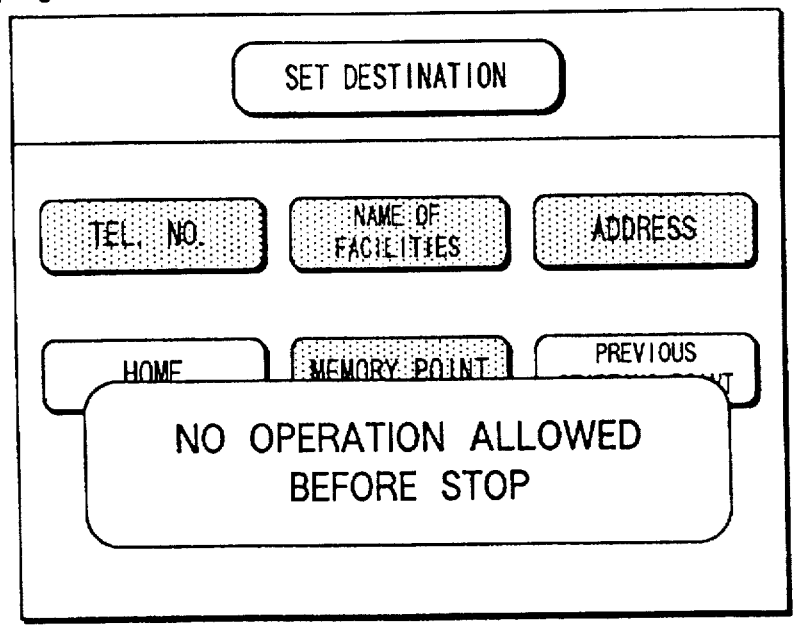
FIG.2 (d)
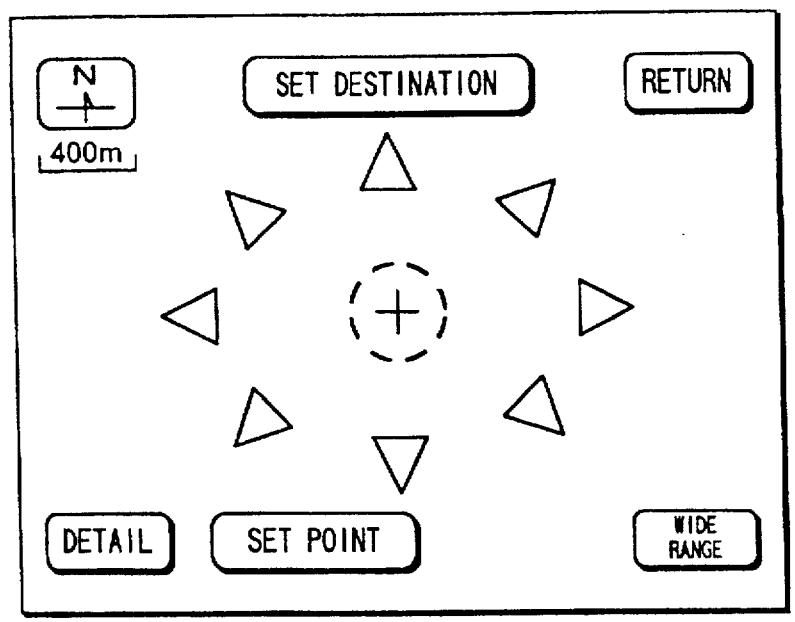

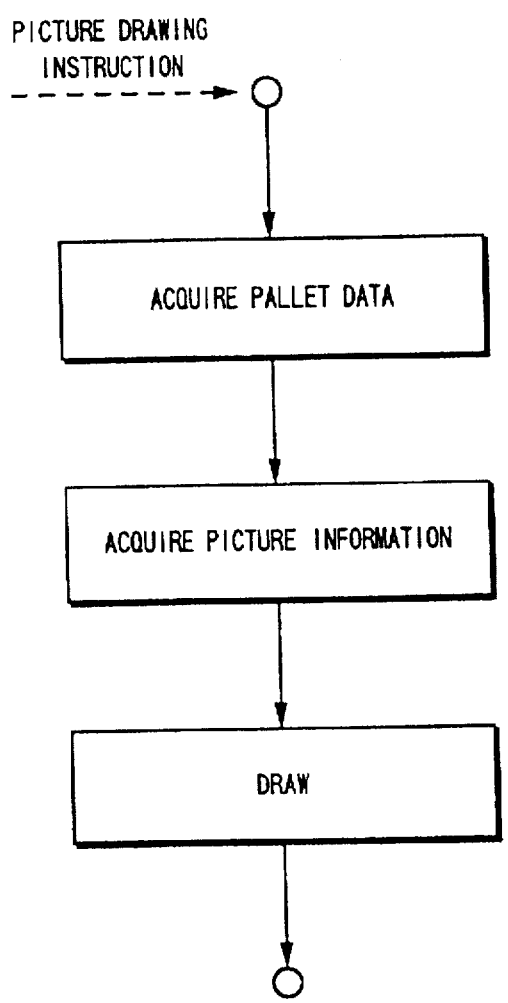

FIG.10

| PICTURE ELEMENTS | PALLET No. |
|---|---|
| LOWER PORTION OF SELECT SW | 0 |
| BACKGROUND OF RUNNING-OPERABLE SW | 1 |
| BACKGROUND OF SELECT SW | 2 |
| BACKGROUND OF PICTURE (DISPLAY PORTION) | 3 |
| BACKGROUND OF PICTURE (INPUT PORTION) | 4 |
| UPPER FRAME OF RUNNING-INOPERABLE SW | 5 |
| BACKGROUND OF RUNNING-INOPERABLE SW | 6 |
| BACKGROUND OF TITLE | 7 |
| LETTERS OF ITEMS | 8 |
| LOWER FRAME OF RUNNING-INOPERABLE SW | 9 |
| SW LETTERS | 10 |
| BACKGROUND OF ITEMS | 11 |
| UPPER FRAME OF SELECT SW | 12 |
| UPPER FRAME OF RUNNING-OPERABLE SW | 13 |
| LOWER FRAME OF RUNNING-OPERABLE SW | 14 |
| DESTINATION/TRANSIT MARKS | 15 |

FIG.11 (a)

STOP (DAYTIME)

| No. | R | G | B |
|-----|---|---|---|
| 0   | 5 | 8 | 7 |
| 1   | 9 | 8 | D |
| 2   | 3 | B | 8 |
| 3   | 5 | 5 | 6 |
| 4   | D | D | D |
| 5   | B | B | E |
| 6   | 9 | 8 | D |
| 7   | 4 | 4 | 4 |
| 8   | 0 | 0 | 0 |
| 9   | 6 | 5 | A |
| 10  | F | F | F |
| 11  | E | F | F |
| 12  | 9 | C | B |
| 13  | B | B | E |
| 14  | 6 | 5 | A |
| 15  | F | 0 | 6 |

FIG.11 (b)

RUNNING (DAYTIME)

| No. | R | G | B |
|---|---|---|---|
| 0 | 5 | 8 | 7 |
| 1 | 9 | 8 | D |
| 2 | 3 | B | 8 |
| 3 | 5 | 5 | 6 |
| 4 | D | D | D |
| 5 | E | F | F |
| 6 | D | D | D |
| 7 | 4 | 4 | 4 |
| 8 | 0 | 0 | 0 |
| 9 | B | B | B |
| 10 | F | F | F |
| 11 | E | F | F |
| 12 | 9 | C | B |
| 13 | B | B | E |
| 14 | 6 | 5 | A |
| 15 | F | 0 | 6 |

FIG.12 (a)

STOP (NIGHTTIME)

| No. | R | G | B |
|---|---|---|---|
| 0 | 4 | 9 | 8 |
| 1 | 9 | 8 | D |
| 2 | 4 | B | 9 |
| 3 | 5 | 4 | 6 |
| 4 | 0 | 0 | 0 |
| 5 | A | A | D |
| 6 | 9 | 8 | D |
| 7 | 2 | 2 | 3 |
| 8 | F | F | F |
| 9 | 7 | 6 | B |
| 10 | F | F | F |
| 11 | 0 | 0 | 0 |
| 12 | 8 | C | A |
| 13 | A | A | D |
| 14 | 7 | 6 | B |
| 15 | F | 0 | 6 |

FIG.12 (b)

RUNNING (NIGHTTIME)

| No. | R | G | B |
|-----|---|---|---|
| 0 | 4 | 9 | 8 |
| 1 | 9 | 8 | D |
| 2 | 4 | B | 9 |
| 3 | 5 | 4 | 6 |
| 4 | 0 | 0 | 0 |
| 5 | 2 | 2 | 3 |
| 6 | 0 | 0 | 0 |
| 7 | 2 | 2 | 3 |
| 8 | F | F | F |
| 9 | 1 | 1 | 2 |
| 10 | F | F | F |
| 11 | 0 | 0 | 0 |
| 12 | 8 | C | A |
| 13 | A | A | D |
| 14 | 7 | 6 | B |
| 15 | F | 0 | 6 |

DESTINATION INFORMATION

| COORDINATES OF EAST LONGITUDE |
|---|
| COORDINATES OF NORTH LATITUDE |
| ROAD NO. |
| ADDRESS |
| NAME |
| |

TRANSIT INFORMATION

| COORDINATES OF EAST LONGITUDE |
|---|
| COORDINATES OF NORTH LATITUDE |
| ROAD NO. |
| ADDRESS |
| NAME |

D-3

MAP DRAWING INFORMATION

| EAST LONGITUDE COORDINATES OF LEFTHAND LOWER PORTION OF PICTURE |
|---|
| NORTH LATITUDE COORDINATES OF LEFTHAND LOWER PORTION OF PICTURE |
| EAST LOGITUDE COORDINATES OF CENTER OF PICTURE |
| NORTH LATITUDE COORDINATES OF CENTER OF PICTURE |
| REDUCED SCALE |
| AZIMUTH OF DISPLAY |
| |

FIG. 14(c)

FIG.15 (a)
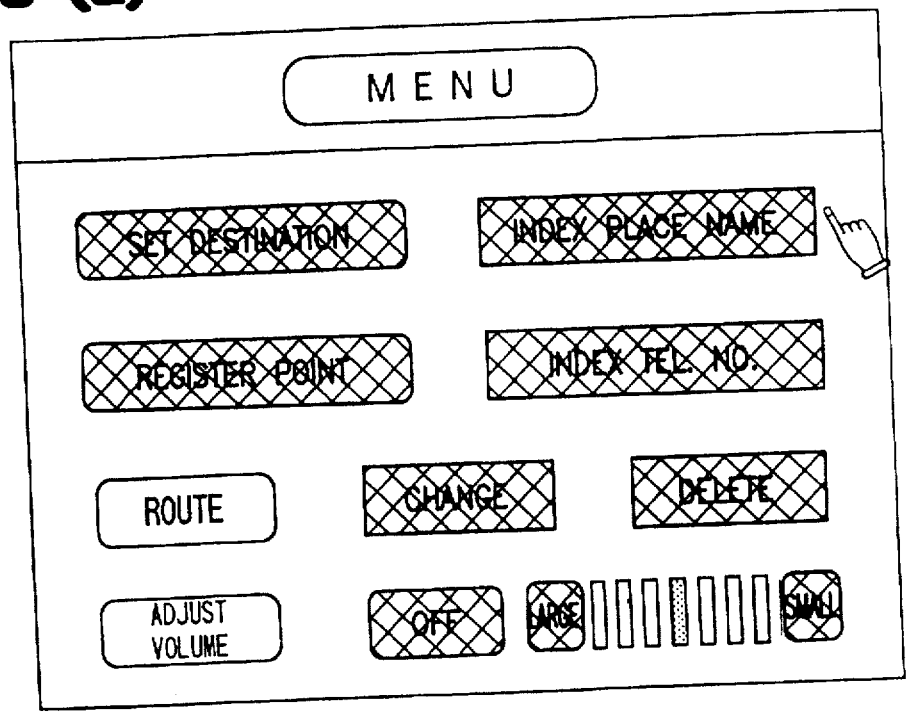
FIG.15 (b)
DISPLAY PREDETERMINED MAP BY INDEXING PLACE NAME
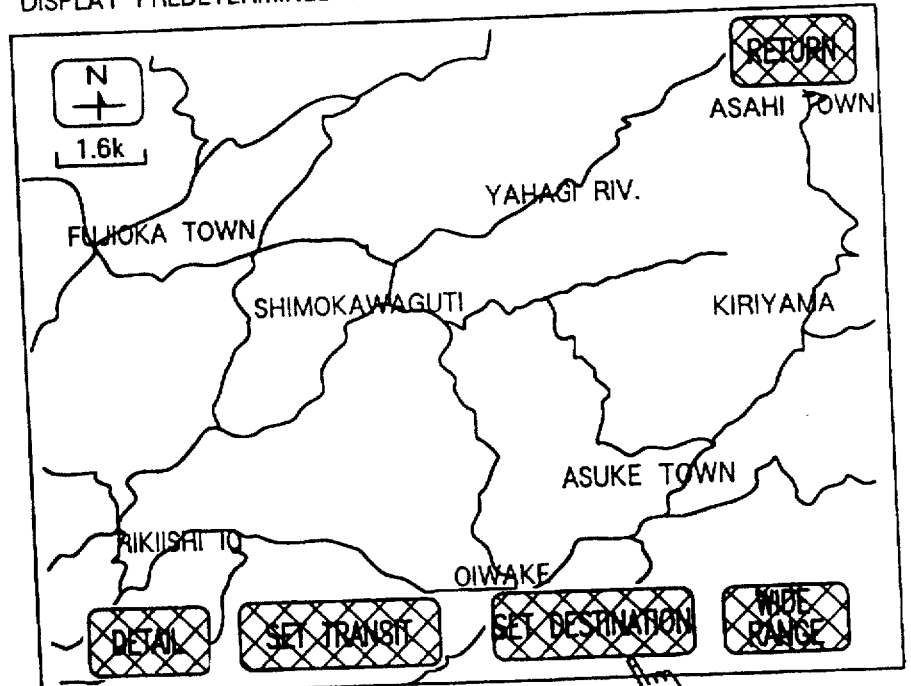

FIG.23 (a)
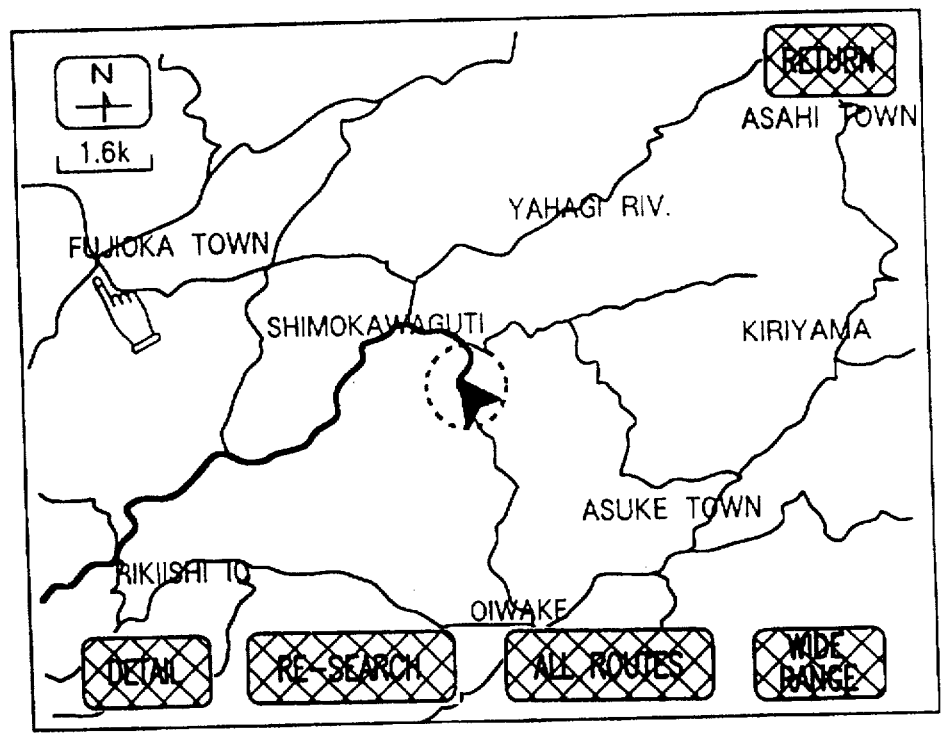
FIG.23 (b)
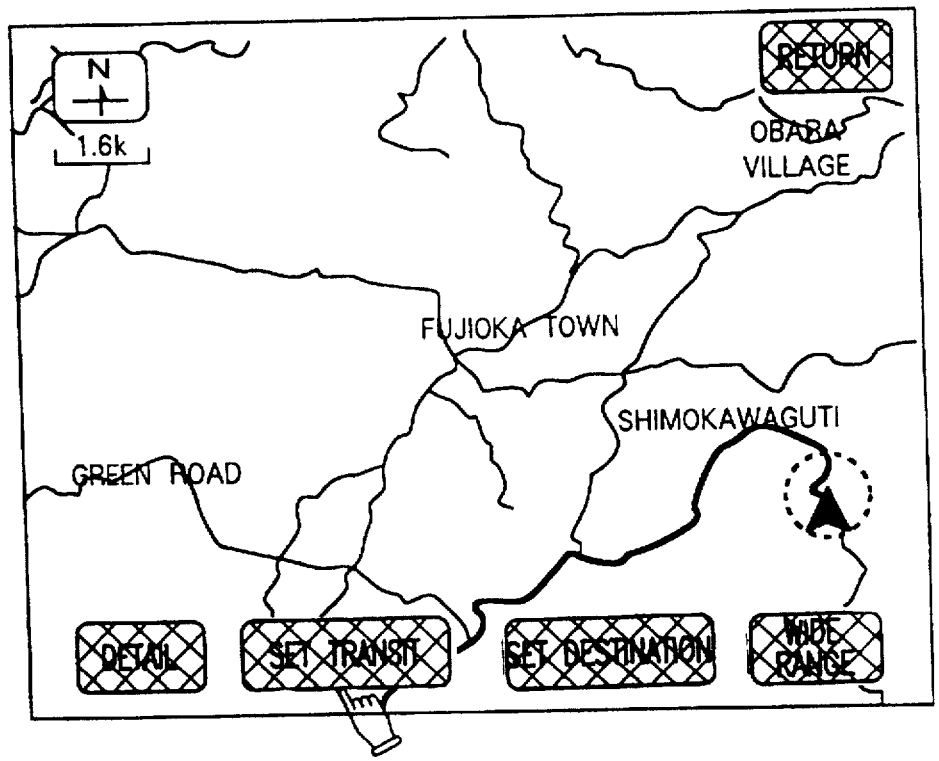

FIG.24 (a)
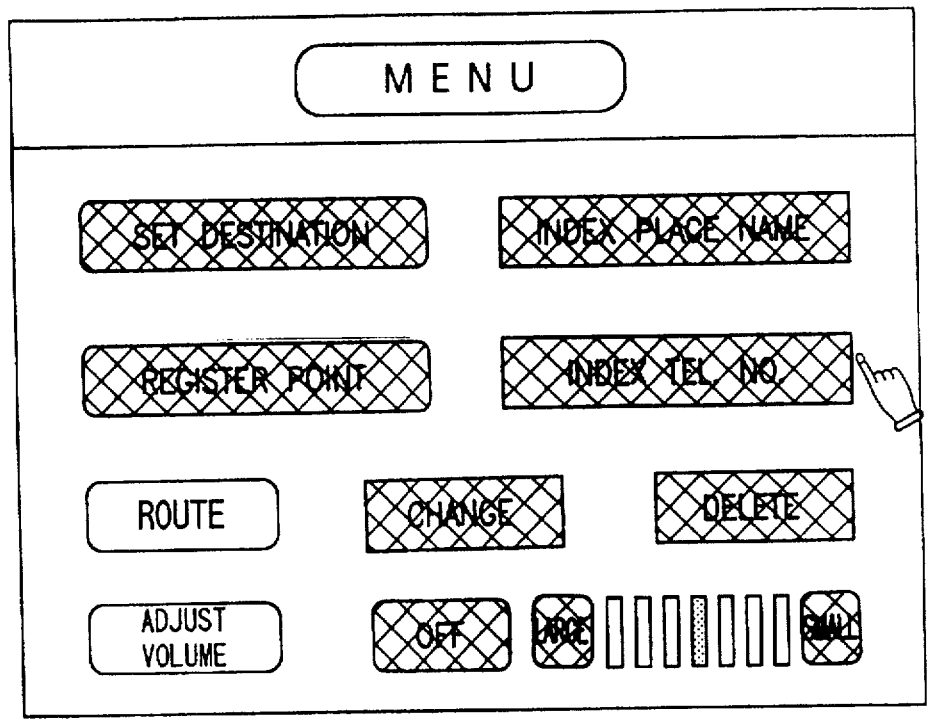
FIG.24 (b)
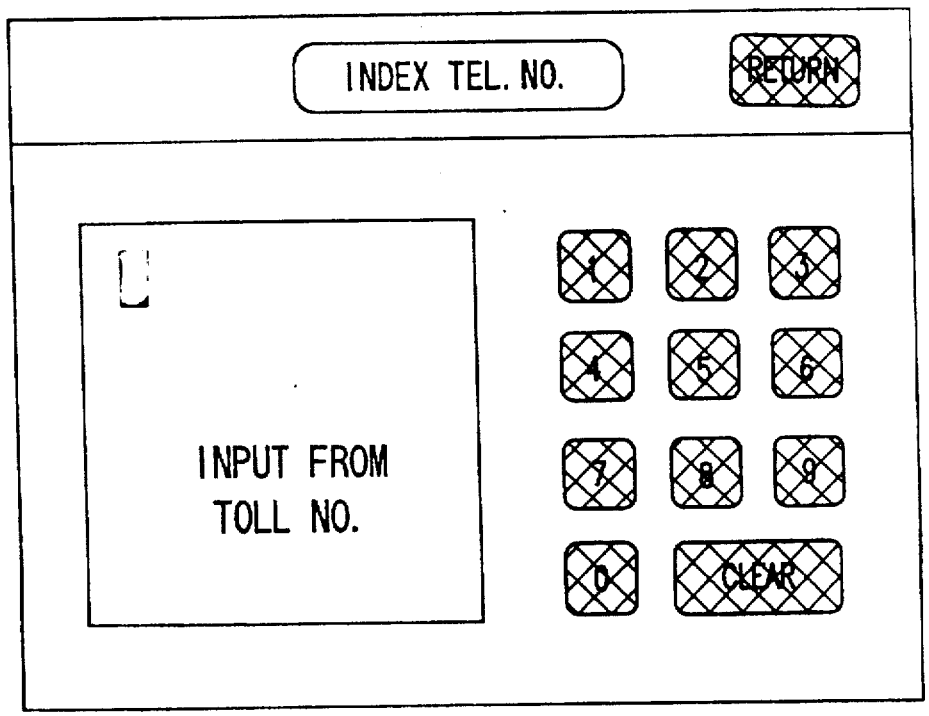

FIG.25 (a)
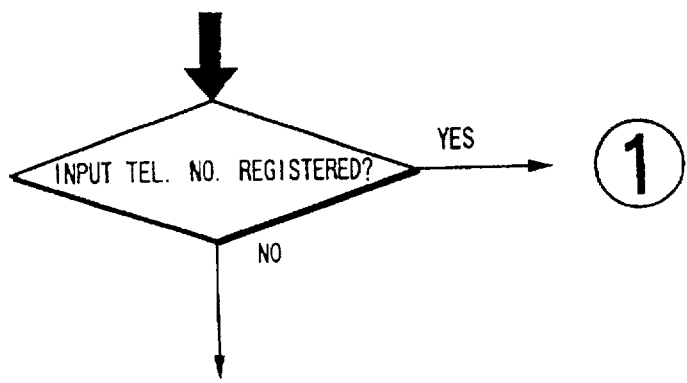
FIG.25 (b)
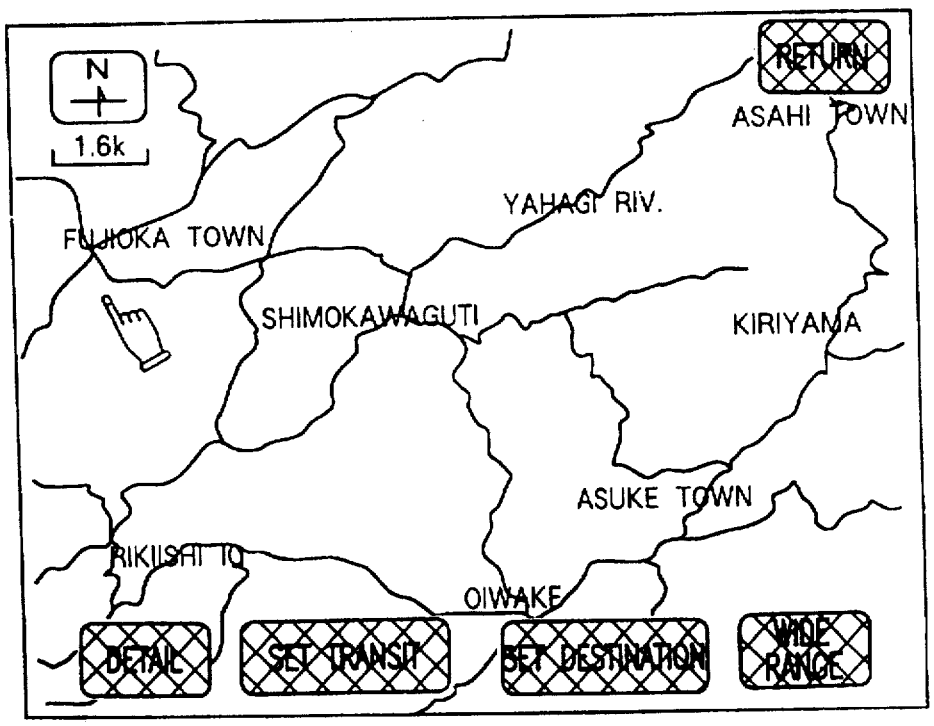

FIG. 31
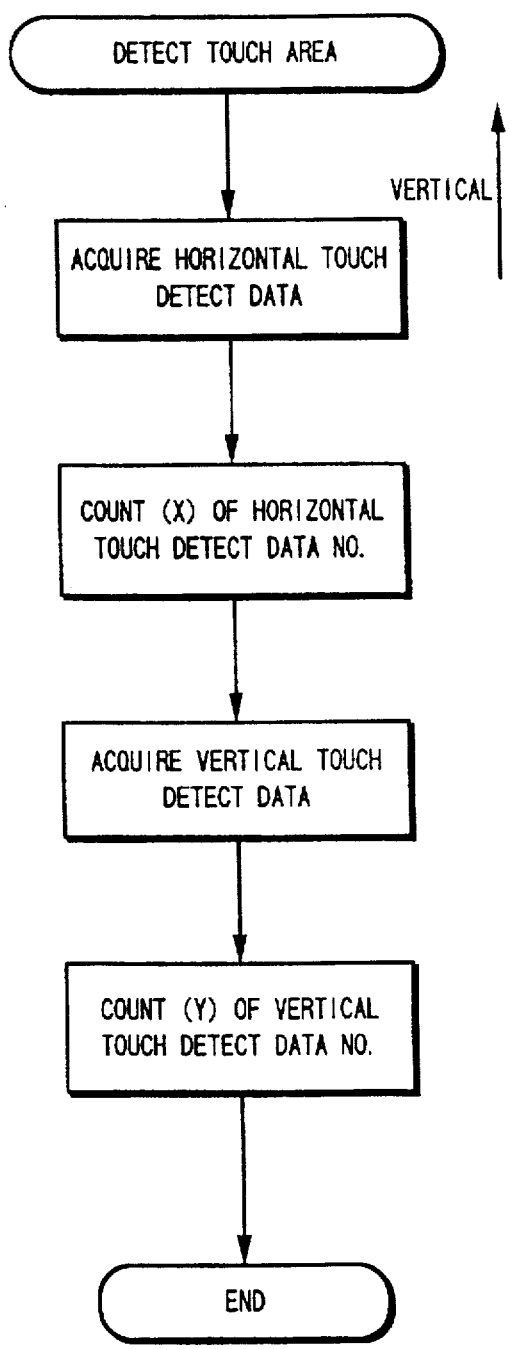
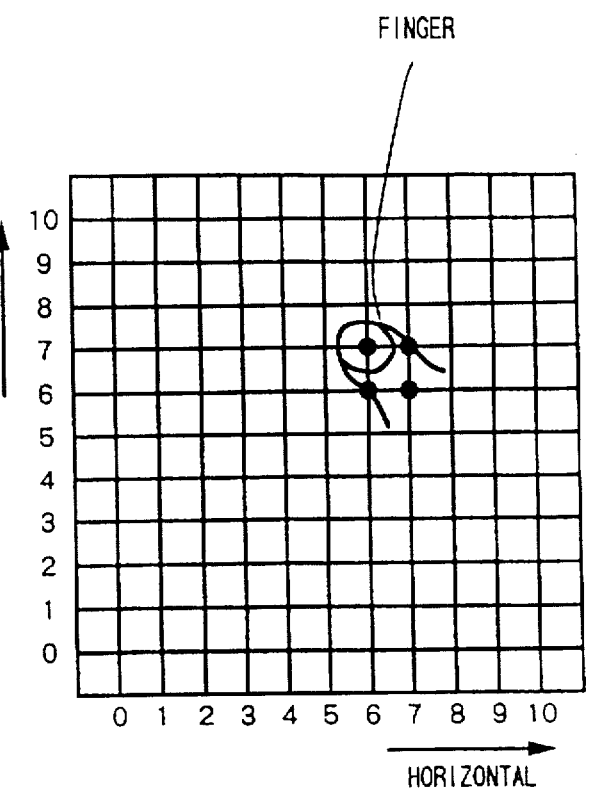

WHY (Y+1) ?

SINCE THE TOUCH DETECT POSITION IS POINTED AND STEPPED, ITS TWO ADJOINTINGPOSITIONS ARE CONSIDERED WHEN OBSERVER AS AN AREA.

5,757,359

VEHICULAR INFORMATION DISPLAY SYSTEM

BACKGROUND OF THE INVENTION

1. Field of the Invention

The present invention relates to a vehicular information display system for controlling the picture of a display unit mounted on a vehicle, in accordance with whether the vehicle is running or stopped.

2. Related Art

Conventional navigation systems are designed to guide the driver safely to a destination. In recent years, technical developments have been made to improve the performance and functions such as the accuracy, operability and visibility of the navigation systems. Such navigation systems are equipped with a display screen to be used for setting a route and a display screen which opens, automatically or in response to the request of the driver, for route guidance. The display screen after the start of guidance shows: a section diagram covering a wide area including several sections, including the one with the present location, of the whole route; and a node diagram for guiding the driver at an approaching node.

Moreover, the route can be confirmed, not only by reference to the section diagram and the node diagram, but also by reference to information regarding the remaining distance, name and turning directions for a node, at which the vehicle is to be turned. To facilitate correct following of the route, the route is confirmed during running by guidance, not only by visual display but also by voice, with display of the route on a map and guidance along the route during actual travel, and with scrolling the map automatically along the route.

This navigation system requires input of a starting point and a destination so as to set the route. When the starting point and the destination are determined by these inputs, the route search is executed from road data for the area in the vicinity of the starting point and the destination and intermediate road data, so that the optimum route is selected from among the plurality of possible routes. The various methods for inputting the starting point and the destination include: a method which involves inputting a code registered for the starting point and a code registered for a genre of destinations, for example, sightseeing locations, parking areas, restaurants or a geographical area such as prefecture or city; a method which involves inputting code numbers; a method which involves selecting items sequentially from the menu displayed; a method involving input of the positions in terms of the coordinate values of east longitude and north latitude with definition of the road net by node-connecting data; and a method involving input of a telephone number. In another method, not only the route between the two points such as the present position or an arbitrary starting point and the destination is searched, but also a search is made to give priority to a transit or an expressway.

The telephone number inputting method is exemplified by that disclosed in Japanese Patent Laid-Open No. 187898/1990. The genre or code number inputting method is exemplified by the system disclosed in Japanese Patent Application Laid-Open No. 173820/1989. The destination setting method by input of a code number is exemplified by the system disclosed in Japanese Patent Application Laid-Open No. 173823/1989. A method involving inputting of a point to be passed is exemplified by the system as disclosed in Japanese Patent Application Laid-Open No. 3899/1990. An inputting method using an infrared ray touch panel is disclosed in Japanese Patent Application Laid-Open No. 173821/1989.

In the setting of a destination in a navigation system of the prior art, the input key is displayed in the same color in the destination setting, regardless of whether the vehicle is stopped or running. Moreover, some input keys are disabled (inhibited) during running and, when a disabled key is touched, a message advising this situation is displayed. Especially in the case of a beginner user, he cannot distinguish between the running-operable keys and the running-inoperable keys, even if both running-operable and running-inoperable keys are simultaneously displayed, i.e. in a mixed state, so that the beginner may attempt to operate an inoperable key. Even if a message advising of the inoperability is displayed, the user may become bewildered because he does not know what input key can be operated.

Moreover, because the input key may appear to be operable, although really inoperable, the user may become irritated when he receives the message of inoperability. Furthermore, when the user touches the running-inoperable key after he stops the vehicle, the operation inhibition message may nevertheless appear because of a lag in processing time if the touch occurs simultaneously with the stop. This may delay the inputting when the user desires early input.

SUMMARY OF THE INVENTION

The present invention addresses the above-specified problems and has as its object provision of a vehicular information display system which enhances safety during running by making it easy to identify a running-inoperable input key.

According to one feature of the present invention, therefore, there is provided a vehicular information display system comprising: display means mounted on a vehicle; run/stop deciding means for deciding whether the vehicle is running or stopped; display color control means for changing the colors of individual picture elements of the picture of the display means during transition between running and stop, in accordance with a signal from the run/stop deciding means; input means for inputting the selection and instructions for the display; picture transition control means for controlling the transition of the picture in accordance with the instruction of the input means; and picture drawing means for drawing the picture, which is controlled by the picture transition control means, in the colors of the picture element selected by the display color control means, wherein the picture display of the display means is formed with control of the colors of the picture elements selectively, in accordance with whether the vehicle is stopped or running.

Another embodiment of the present invention includes daytime/nighttime discrimination means for distinguishing between daytime and nighttime, wherein the display color control means changes the colors of the individual picture elements in accordance with a signal from the daytime/nighttime discrimination means. In another embodiment the display color control means includes a plurality of pallets which are changed, in accordance with the decision signal of the run/stop deciding means, to control the colors of the individual picture elements of the picture displayed by the display means.

According to a further feature, the input means includes a touch panel combined with the display screen of the display means. According to another feature, the picture transit control means has the capability of deciding whether or not the instruction of the input means is inhibited (inoperable) when the vehicle is running and the capability of displaying a running-inoperable message in case the operation is inhibited.

The vehicular information display system according to the present invention includes display means mounted on the vehicle; run/stop deciding means for deciding whether the vehicle is running or stopped; display color control means for changing the colors of individual picture elements of the displayed picture during running and stop, in accordance with the decide signal of the run/stop decide means; input means for inputting the selection of and instructions for the picture; picture transition control means for controlling the transition of the picture in accordance with the instruction of the input means; and picture drawing means for drawing the picture, which is controlled by the picture transition control means, in the colors of the picture elements selected by the display color control means, wherein the processing for color selection is executed selectively in accordance with whether the vehicle is stopped or running. As a result, the running-inoperable input keys may be controlled so as to be, for example, the same color as that of the background so that they can be visibly distinguished from the running-operable keys. Thus, only the input keys which can be operated by a single action, to input the desired instruction, are displayed as the running-operable keys, so that the user can safely operate the input keys displayed in the information display unit. As a result, the user can set a destination such as his home or the previous starting point, even while running (driving), with minimal likelihood of careless input.

A daytime/nighttime deciding means is provided for distinguishing between daytime and nighttime and providing a decision signal, and the display color control means changes the colors of the individual picture elements in accordance with the decision signal. The display color control means includes a plurality of pallets, which are changed in accordance with the decision signal of the run/stop deciding means, to control the colors of the individual picture elements of the picture of the display means. As a result, the colors displayed while stopped and during running can be simply controlled to enable visual distinguishing of the running-operable keys from the running-inoperable keys in both daytime and nighttime.

By changing the display colors, rather than deleting the running-inoperable keys, as described above, the user is not misled to believe that the system has gone down, as the user might if the display picture was blank or smeared, even if all the keys on the displayed screen are inhibited (inoperable) as in the case of the telephone number inputting display. Moreover, the running-inoperable keys can be given a color such as a dark color different from that of other keys. Then, if the inoperable keys are erroneously operated during running, so that a cautionary message is displayed, the user can recognize that the keys having the displayed color are inhibited and can be operated only if stopped.

BRIEF DESCRIPTION OF THE DRAWINGS

FIGS. 2(a), 2(b), 2(c) and 2(d) illustrate an example of picture transition between running and stop, responsive to a key operation;

FIG. 9 is a flow chart for a picture drawing routine;

FIG. 10 is a table of examples of corresponding picture elements and pallets;

FIG. 11(a) is a table of daytime pallet data for the stopped vehicle and FIG. 11(b) is a table of daytime pallet data for the running vehicle;

FIG. 12(a) is a table of nighttime pallet data for the stopped vehicle and FIG. 12(b) is a table of nighttime pallet data for the running vehicle;

FIGS. 14(a), 14(b) and 14(c) are diagrams of stored map display-point information data;

FIGS. 15(a) and 15(b) show examples of a menu picture and a map display picture, respectively;

FIGS. 23(a) and 23(b) are diagrams illustrating an example of display scrolling for setting a transit during route guidance;

FIGS. 24(a) and 24(b) are diagrams showing an example of displays for indexing a telephone number;

FIGS. 25(a) and 25(b) are diagrams illustrating an example of the case in which the telephone number is not registered;

FIG. 31 is a flow diagram for explaining touch area detecting processing;

DESCRIPTION OF THE PREFERRED EMBODIMENT

Embodiments of the present invention will be described in the following with reference to the accompanying drawings.

Figure 1:
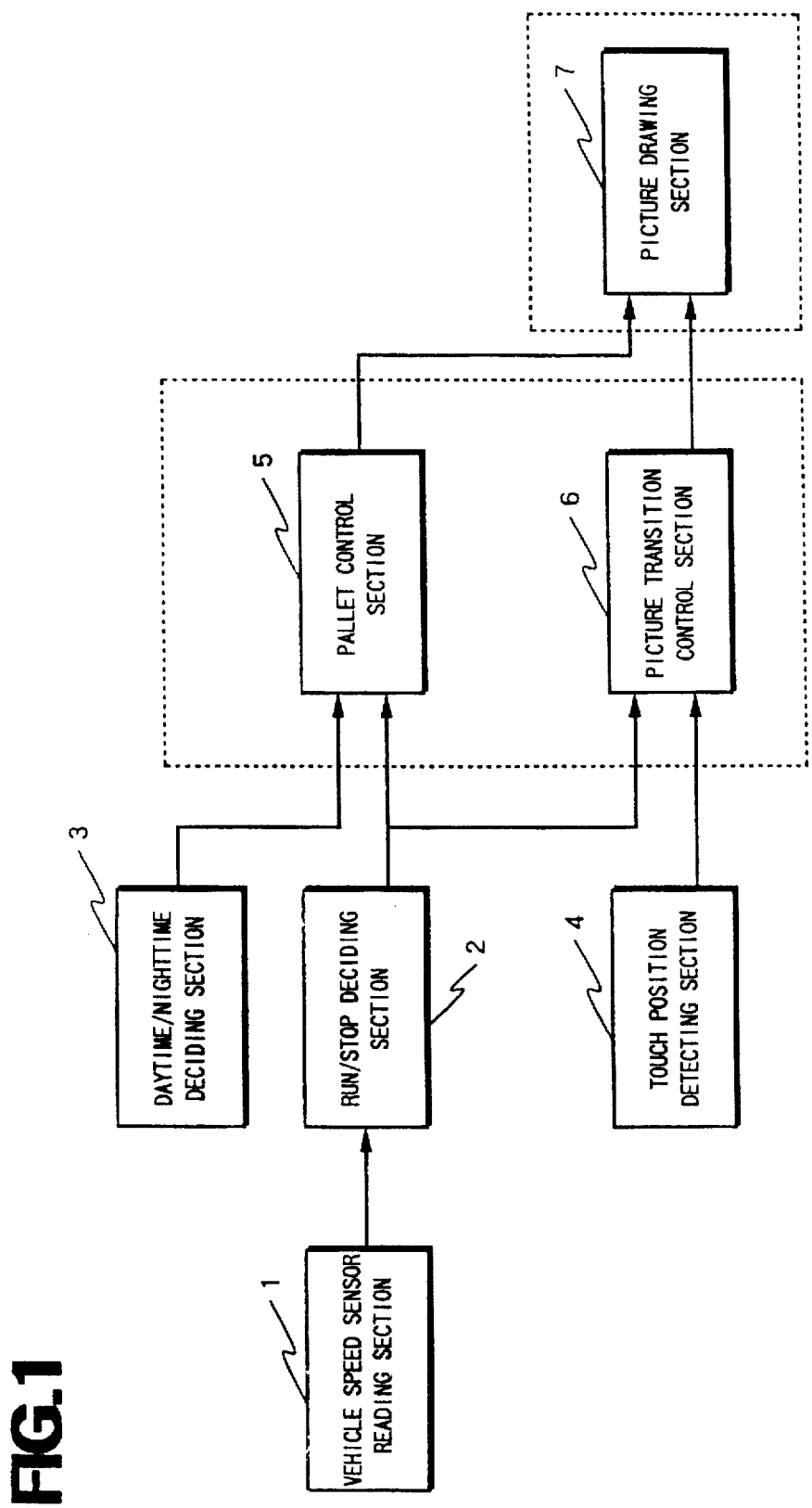
FIG. 1 is a block diagram of one embodiment of a vehicular information display device according to the present invention.

FIG. 1 is a block diagram of one embodiment of a vehicular information display device according to the present invention, and FIGS. 2(a) and 2(b) illustrate change in a picture display between running (FIG. 2(a)) and stopped (FIG. 2(b)), by a key operation.

In FIG. 1, a vehicle speed sensor reading section 1 reads the signal of vehicle speed sensors including a wheel speed meter and an acceleration meter, and a run/stop deciding section 2 decides whether the vehicle is in the running state or stopped, from the read signal of the vehicle speed sensors. A daytime/nighttime deciding section 3 decides whether it is daytime or nighttime, by means of an illumination meter or a light switch. A touch position detecting section 4 detects the position of an input touch by scanning the vertical and longitudinal lines of a touch panel which is combined with the picture display. A pallet control section 5 is equipped with a plurality of pallets, each pallet being a different color for individual picture elements, and changes the pallets in dependence upon whether the vehicle is running state or stopped and whether it is daytime or nighttime. A picture transition control section 6 controls the picture transition in dependence upon whether the vehicle is running or stopped and the detected position of the touch input. A picture drawing section 7 draws the picture, which is controlled by the picture transition control section 6, in the colors of the pallets selected by the pallet control section 5.

An example of a picture transition controlled by the picture transition control section 6 is shown in FIGS. 2(a) and 2(b). In order for the navigation system to set a route, it is necessary to input and set a starting point and a destination, as has been described before. When the starting point and the destination are determined by that setting, a route search is made from the data for the vicinities of the starting point and the destination and the roads between them, so that an optimum route is selected from among a plurality of possible routes. In the destination setting display to be used in this case, there are displayed input keys for selecting the types of input such as "TEL. NO.", "NAME OF FACILITY", "ADDRESS", "HOME", "MEMORY POINT" or "PREVIOUS STARTING POINT" for setting the destination, as shown in FIG. 2(a).

The "TEL. NO." key is used when the destination point, stored in advance in correlation with the telephone number, is to be set as the destination by inputting the telephone number. The "NAME OF FACILITY" key is used when the destination is to be selected and set in terms of the name of the facility, such as a city office, a station, a fire station, a police station, a public library, a city hall or a parking area. The "ADDRESS" key is used when an address is to be input to set the destination. The "HOME" key is used when a home location, stored in advance, is to be set as the destination. The "MEMORY POINT" key is used when an arbitrary point, stored in advance by the user, is to be set as the destination. The "PREVIOUS STARTING POINT" key is used for setting the previous starting point as the destination when the vehicle is to return to the starting point. Of these keys, the "HOME" and "PREVIOUS STARTING POINT" can set the destination by a single action, but the remaining input keys require a subsequent operation, such as inputting a number or selecting and inputting the name of a facility.

In the present invention, therefore, the "HOME" and "PREVIOUS STARTING POINT" input keys, capable of setting the destination by a single action, are allowed to be operated even during running, whereas the remaining input keys are inhibited to prevent operation during running. All the input keys are displayed in a common color when stopped, as shown in FIG. 2(b). When running, only the input keys which cannot be operated during travel are indicated in a different color, as shown in FIG. 2(a). Moreover, when an attempt is made to operate an input key inhibited from operation during running, such as a telephone number input key, a message "NO OPERATION ALLOWED BEFORE STOP" is displayed, as shown in FIG. 2(c). If the "HOME" input key is operated, the point setting input key is displayed, as shown in FIG. 2(d). When this point setting input key is operated, the destination setting procedure is ended. In this case, an eight-directional cursor Δ is displayed in a color indicating an unusable key. The pallet (color) is changed so that the color for the inhibited key may be a dark color or a neutral color similar to that of letters which are also displayed in neutral colors.

Figure 3:
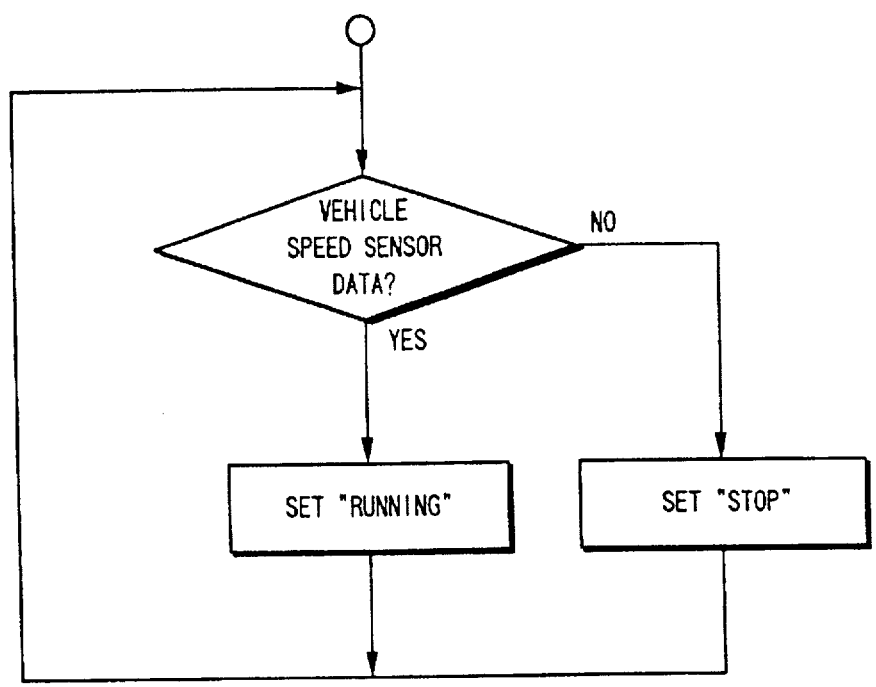
FIG. 3 is a flow chart for a stop/run decision routine.
Figure 4:
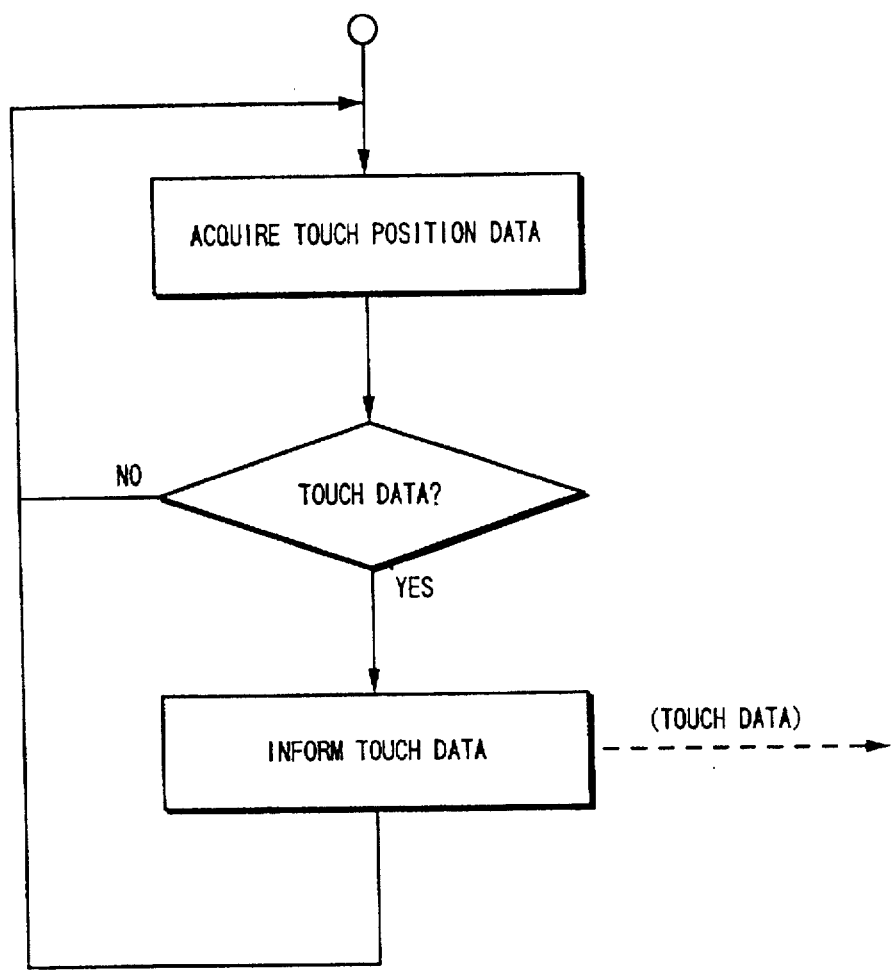
FIG. 4 is a flow chart of a touch position detection routine.
Figure 5:
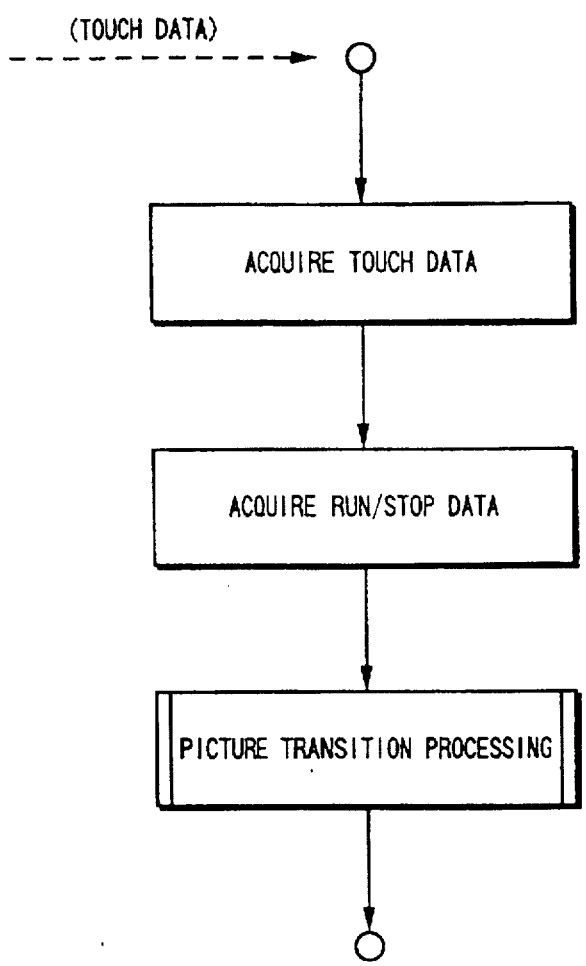
FIG. 5 is a flow chart of a picture transition control routine.
Figure 6:
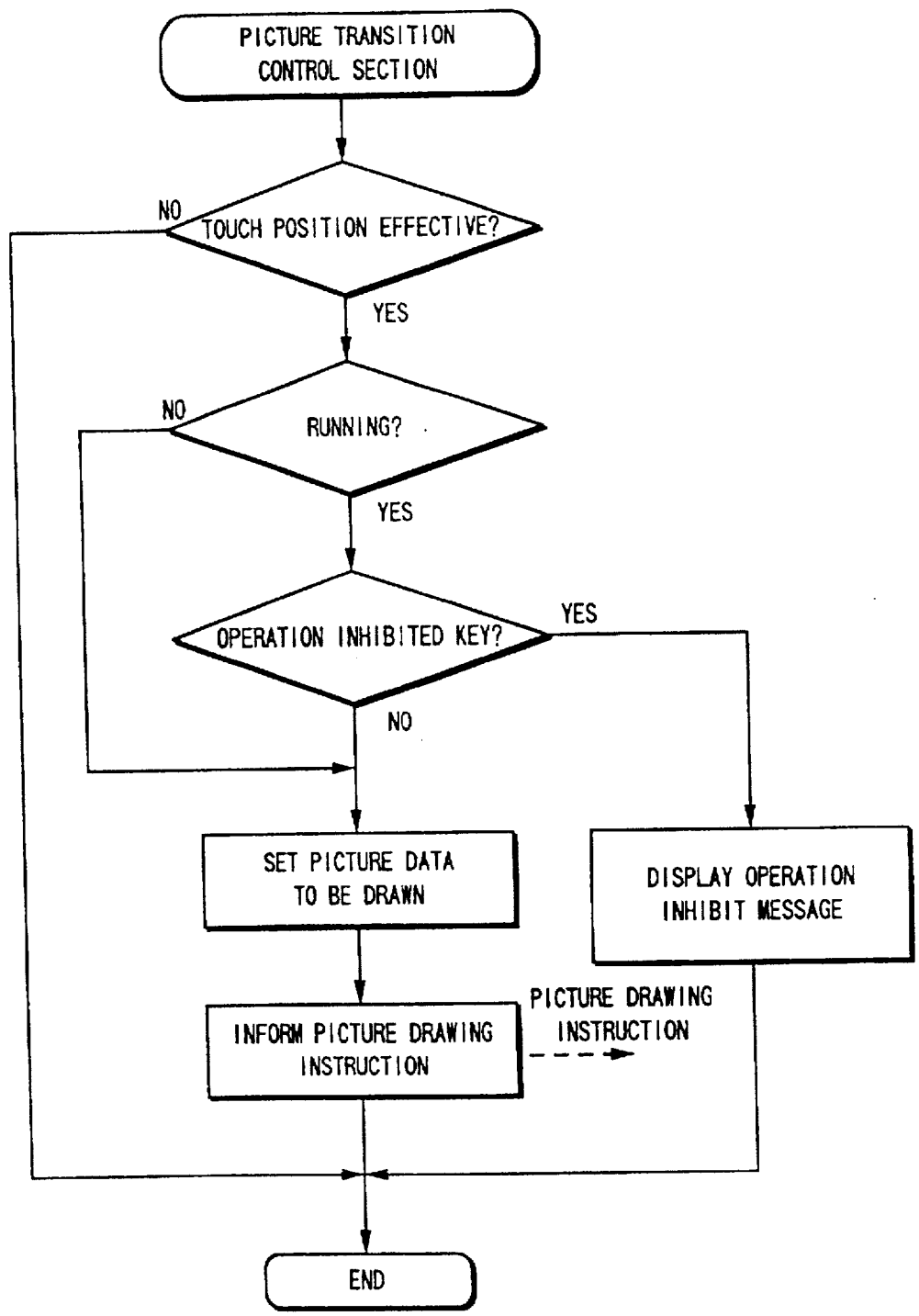
FIG. 6 is a flow chart of a picture transition processing subroutine.
Figure 7:
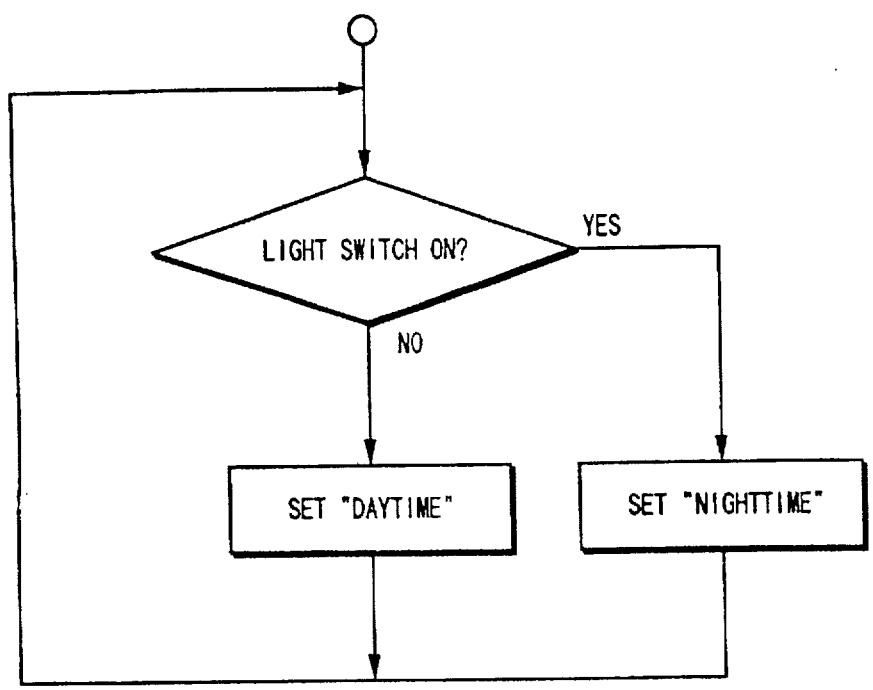
FIG. 7 is a flow chart of a daytime/nighttime decision routine.
Figure 8:
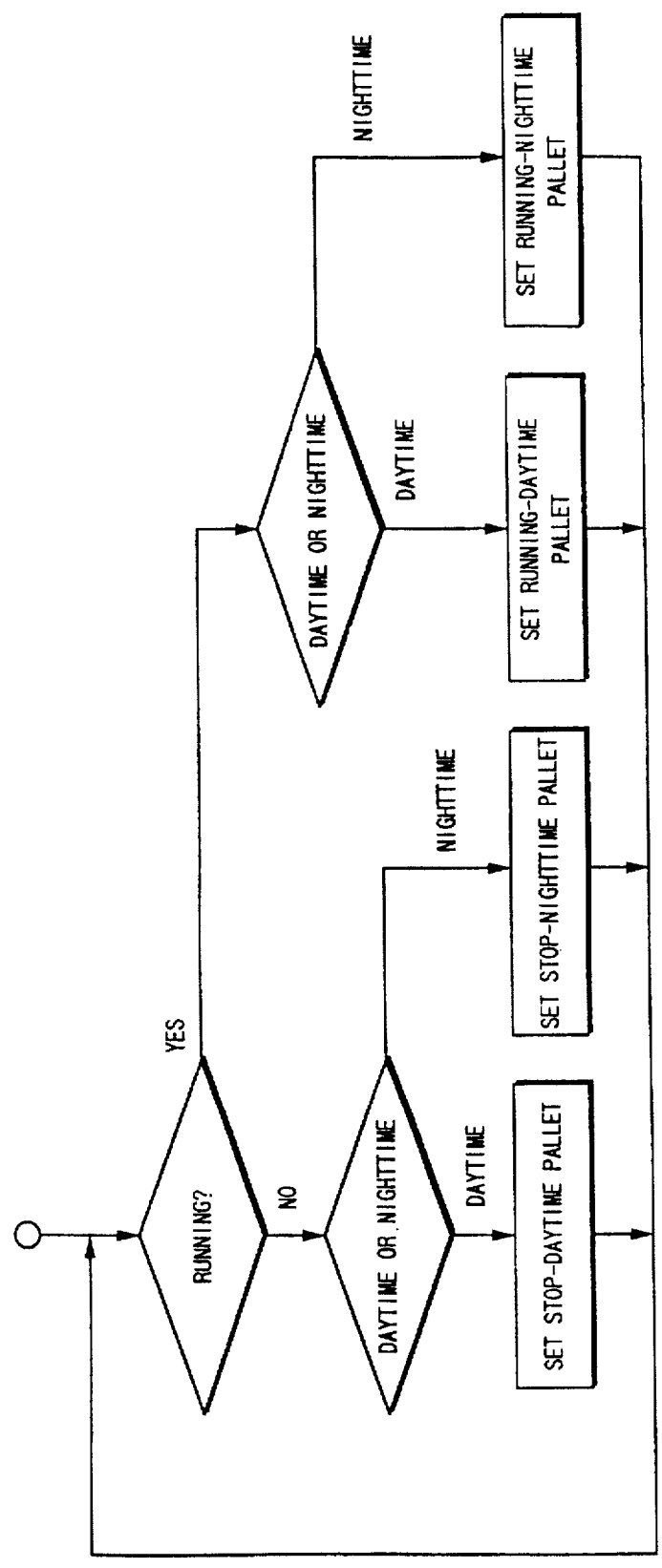
FIG. 8 is a flow chart for a pallet control routine.

Here will be described the processing within the individual sections shown in FIG. 1. FIG. 3 is a flow chart for the processing routine of the stop/run deciding section 2; FIG. 4 is a flow chart for the processing routine of the touch position detecting section 4; FIG. 5 is a flow chart for the processing routine of the picture transition control section 6; FIG. 6 is a flow chart for a picture transition processing subroutine; FIG. 7 is a flow chart for the processing of a daytime/nighttime deciding section 3; FIG. 8 is a flow chart for the processing routine of the pallet control section 5; and FIG. 9 is a flow chart for the processing routine of the picture drawing section 7.

The run/stop deciding section 2 examines whether or not a signal is being received from the vehicle speed sensor, as shown in FIG. 3, and decides "RUNNING" if the answer is YES or "STOP" if NO. The touch position detecting section 4 scans each line, as shown in FIG. 4, to acquire touch position data and inform the picture transition control section 6 of the touch data, if any. The picture transition control section 6 acquires not only the touch data from the touch position detecting section 4, as shown in FIG. 5, but also the run/stop data from the run/stop deciding section 2 to process the picture transition. The picture transition processing examines whether or not the touch position is effective, whether or not the vehicle is running, and whether or not the input key is inhibited, as shown in FIG. 6. If the touch position is effective and if the vehicle is running, and if the input key is inhibited, a "OPERATION INHIBIT" message is displayed. If the input key is not inhibited, the picture information to be drawn is set to instruct the picture drawing section 7 to draw a predetermined picture. If the touch position is effective but if the vehicle is not running, the predetermined picture is drawn.

The daytime/nighttime deciding section 3 examines, at a predetermined time interval, whether or not the light switch is ON, as shown in FIG. 7, and decides "NIGHTTIME" if ON or "DAYTIME" if OFF. On the other hand, the pallet control section 5 examines, at a predetermined time interval whether or not the vehicle is running and whether it is daytime or nighttime. In accordance with this examination, the pallet control section 5 selects one of "STOP-DAYTIME PALLET", "STOP-NIGHTTIME PALLET", "RUNNING-DAYTIME PALLET" and "RUNNING-NIGHTTIME PALLET". The picture control section 7 acquires the pallet data and the picture information to draw the colors of the individual picture elements of the picture in the colors of the selected pallets.

FIG. 10 is a table of correspondence between picture elements and pallets; FIGS. 11(a) and 11(b) are tables of exemplary daytime pallet data; and FIGS. 12(a) and 12(b) are tables of exemplary nighttime pallet data. Each pallet number in the tables of these drawing figures corresponds to a single color. The colors are the primary colors red, green, blue and combinations thereof. In the headings of the tables of drawing FIGS. 11(a), 11(b), 12(a) and 12(b) "R", "G" and "B" represent red, green and blue, respectively. The numbers and letters in the bodies of these tables indicate the relative brightness of each of the primary color components in a given color (palette number). The brightness of each component color, red, green and blue, is rated on a scale of 16 grades of brightness, i.e. 0, 1, . . . 9, A, B, . . . , F, with the grade "0" being the darkest and the grade "F" being the brightest. As can be seen in a comparison of FIG. 11(a) and FIG. 11(b) with FIG. 12(a) and FIG. 12(b), the pallets for daytime provide brighter colors, near "F" in general, while the pallets for nighttime provide darker colors nearer to "0". Also the pallets for the running-inoperable keys grade from brighter in the stopped state into darker during running. For example, bright red is expressed (F 0 0), dark red is expressed (5 0 0), purple is expressed (F 0 F), violet is expressed (A 0 F), and so on.

The drawn picture is composed of: an upper frame, a lower frame, background and letters for the select switch; and the individual picture backgrounds of the display section and the input portion, the individual display backgrounds of the title and other items, the lettering identifying the other items and the destination/transit marks. In the present invention, the pallet numbers are respectively set for those elements, as shown in FIG. 10, and the pallets Nos. 1, 13, 14, 5, 6 and 9 are respectively set for the upper frames, lower frames and backgrounds of the running-operable select switches and the running-inoperable select switches. Daytime pallet data for the stopped and running states are shown in FIG. 11(a) and FIG. 11(b), respectively and the nighttime pallet data for the stopped and running states are shown in FIG. 12(a) and FIG. 12(b), respectively. Thus, the pallet data are changed not only for the daytime and nighttime so that they are clearly visible both in the brightness of the daytime and in the darkness of the nighttime and in both the stopped and running states, and are in contrast with the upper and lower frames and the background of the running-inoperable select switch. Specifically, not only in the daytime pallet data shown in FIGS. 11(a) and 11(b) but also in the nighttime pallet data shown in FIGS. 12(a) and 12(b): the data, other than for the upper and lower frames and the background of the running-inoperable select switch, are shared in common by the stopped and running states; the data of the upper and lower frames and the background of the running-inoperable select switch are identical during the stopped state to that of the running-operable select switch; but the data of the upper and lower frames and the background of the running-inoperable select switch are changed for the running state. Moreover, the data of the upper and lower frames and the background of the running-inoperable select switch are displayed, in contrast to the background, in chromatic colors of R (red), G (green) and B (blue) during the stopped state but in achromatic colors (gray, or white or black), having a brightness of a value equal to that of R, G and B, during the running state and with an identical background. If white data are (F, F, F), for example, the data are set to brighter data (D, D, D) in daytime but to black data (0, 0, 0) in nighttime.

Incidentally, the present invention should not be limited to the embodiment described above but can be modified in various manners. In the foregoing embodiment, for example, the pallets are interchanged between the daytime and nighttime, but common pallets can naturally be used for the daytime and nighttime. Moreover, the foregoing embodiment is exemplified by displaying the input keys in the display by combining the display with a touch panel. Alternatively, arrow cursors may be displayed in the picture for operation by a joy stick, mouse or wireless controller to select the input keys. The keys inhibited from input during running are exemplified by the key for inputting the name of a facility, which input requires a plurality of key operations to set a particular function. Keys for which operation is allowed during running are keys for functions which can be set by one or two actions. This inhibition may be likewise applied when course guidance or information necessary for the user is presented in the picture. For example, only information easily confirmed from the picture is allowed during running, but information requiring a long time for the user to confirm is inhibited during running. The key color control may change the inoperable key to a color identical to that of the background, so that the key can be made to substantially disappear.

With reference to the drawings, a system will be described in which the information display device of the present invention is applied to a navigation system.

Figure 13:
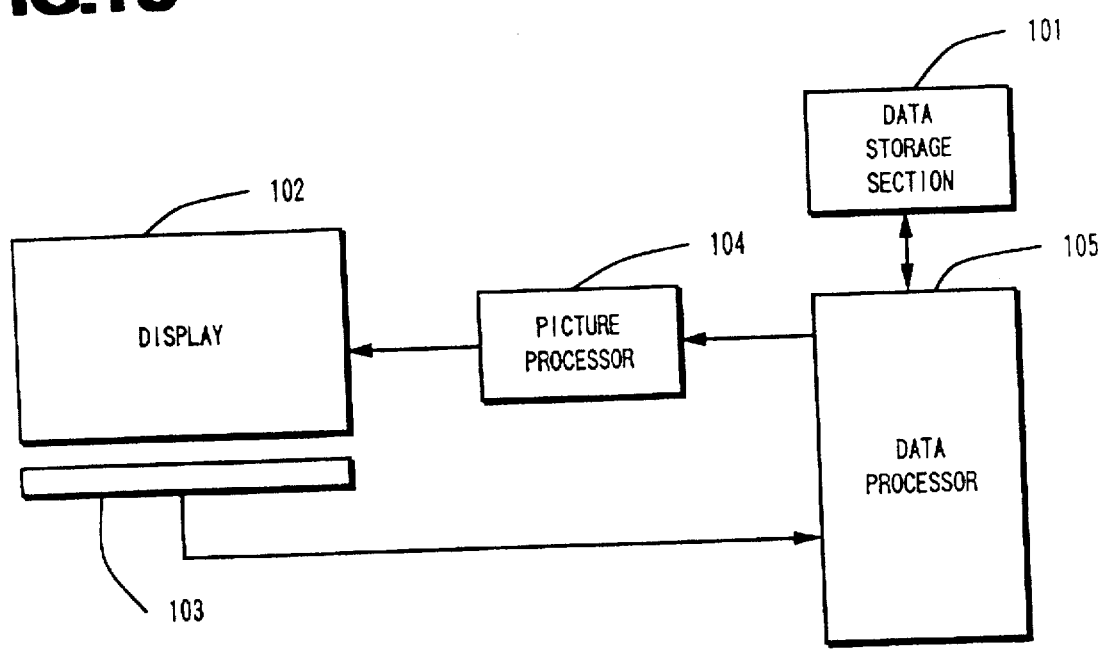
FIG. 13 is a block diagram of one example of a navigation system equipped with the information display system of the present invention.

FIG. 13 is a block diagram of one example of a navigation system to which is applied the information display device of the present invention; FIGS. 14(a), 14(b) and 14(c) are file diagrams of map display-point information as stored in a data storage section; and FIG. 15(a) is a diagram showing one example of a menu display and FIG. 15(b) is a map display picture.

In FIG. 13, a data storage section 101 contains stored map data and various data necessary for the map display-point information and the route search and guidance, and the map data includes map drawing information for a plurality of scales for inputting the point, such as the starting point, the destination or the transit and for providing guidance information along the route. The display 102 is a color CRT or a color liquid crystal display and is mounted in the instrument panel near the driver's seat. The display 102 further displays in color, not only all the pictures that are necessary for navigation such as the route setting picture, but also the section picture and the node picture based upon the map data or the guidance data to be processed by a data processor 105, but also the input keys for setting the route guidance, for selecting route guidance, for switching the pictures and for telephone communications. Of these, certain information such as the name of the node to be passed is temporarily displayed by popping up in color in the section map picture. This enables the driver to confirm the present position of his own vehicle and to acquire information for the route to be followed, by merely observing the section map. This display 102 functions as the display device of the present invention.

A picture processor 104 stores in a picture memory the picture data to be used for the display 102, retrieves the picture data from the picture memory on the basis of the display control signal coming from the data processor 105, and processes the picture data to output a desired picture on the screen of the display 102. This picture processor 104 functions as the picture drawing section 7 of the present invention.

A switch 103 may be (1) touch switches or keys on the touch panel, i.e. the function buttons displayed in the display 102 and/or (2) button switches provided around the periphery of the display 102, so that the various operations are executed responsive to signals inputted from those switches. Thus, the input signal generating means forming the input portion may include the touch switches in the touch panels and/or button switches which together constitute the touch position detecting section 4 of the present invention.

The data processor 105 processes the input information coming from the switch 103 by, for example, changing the map display to a predetermined scale or scrolls the map to control the displayed picture content of the display 102 through the picture processor 104 by executing the program for searching the route or the program for the display control necessary for route guidance or the voice output control necessary for voice guidance. This data processor 105 constitutes the pallet control section 5 and the picture transition control section 6 of the present invention.

The map display-point information stored in the data storage section 101 includes: destination information D-1 and the transit information D-2 composed of the coordinates of east longitude, the coordinates of north latitude, the road No., the address and the name; and the map drawing information D-3 composed of the east longitude coordinates of the left-hand lower portion of picture, the north latitude coordinates of the left-hand lower portion of picture, the east longitude coordinates of the center of picture, the north latitude coordinates of the center of picture, the reduced scale and the azimuth of display.

The display screen 102 displays the menu picture, as shown in FIG. 15 (a), for inputting the point by setting the destination or registering the point. Thus, a point such as the destination or transit is input through the picture display. The menu picture is displayed with the touch keys of "SET DESTINATION", "INDEX PLACE NAME", "REGISTER POINT", "INDEX TEL. NO.", "CHANGE", "DELETE", "OFF", "LARGE" and "SMALL". The "SET DESTINATION" key is for shifting to a destination setting mode, in which the picture is shifted to the search key pictures for the place name index, the home, the present location and its vicinity, the memory point, the national map, the telephone number or the previous starting point, and the route search is executed when the destination is set. The "INDEX PLACE NAME" key is for searching a prefecture name or a city name to open the map of the desired city or area or its vicinity and is used as an atlas. The "REGISTER POINT" key is used when the driver registers an arbitrary point as point data taken from the map data. Usually, the navigation system will be stored in advance with destinations classified according to their genre, for example, as the information for setting the destination, so that the destination may be set by searching such prestored destination data. The "REGISTER POINT" key makes an addition to stored data and is used in the case that the driver wants to register a point such as his home, address of an acquaintance, facility or agency. This point information is composed of the point number, the name, the coordinates and the telephone number and is registered and stored on the basis of the coordinates set on the map. The "INDEX TEL. NO." key is for displaying a map of the immediate vicinity around the point registered for the telephone number inputted. In the absence of the corresponding telephone number, the "INDEX TEL. NO." key displays the map of the area around a representative point for the toll or local exchange number. The "CHANGE" and "DELETE" keys are for changing and deleting the route searched and stored. The "OFF", "LARGE" and "SMALL" keys are for controlling and adjusting the volume of a voice output device, separately provided but not shown.

In the navigation system according to the present embodiment, for example, a point index is selected from the menu screen shown in FIG. 15 (a). When the point is to be searched with input of the prefecture name or the city name, a map of the vicinity of the input named location is displayed, as shown in FIG. 15 (b). When the destination setting or the transit setting is selected, the map is displayed by changing the reduced scale to a desired scale. When the desired point on the map is on a touch panel in the screen, the picture is scrolled to locate that point at the center of the screen. The map is then displayed at a predetermined scale by switching the point setting so that the point at the center of the picture is inputted.

Figure 16:
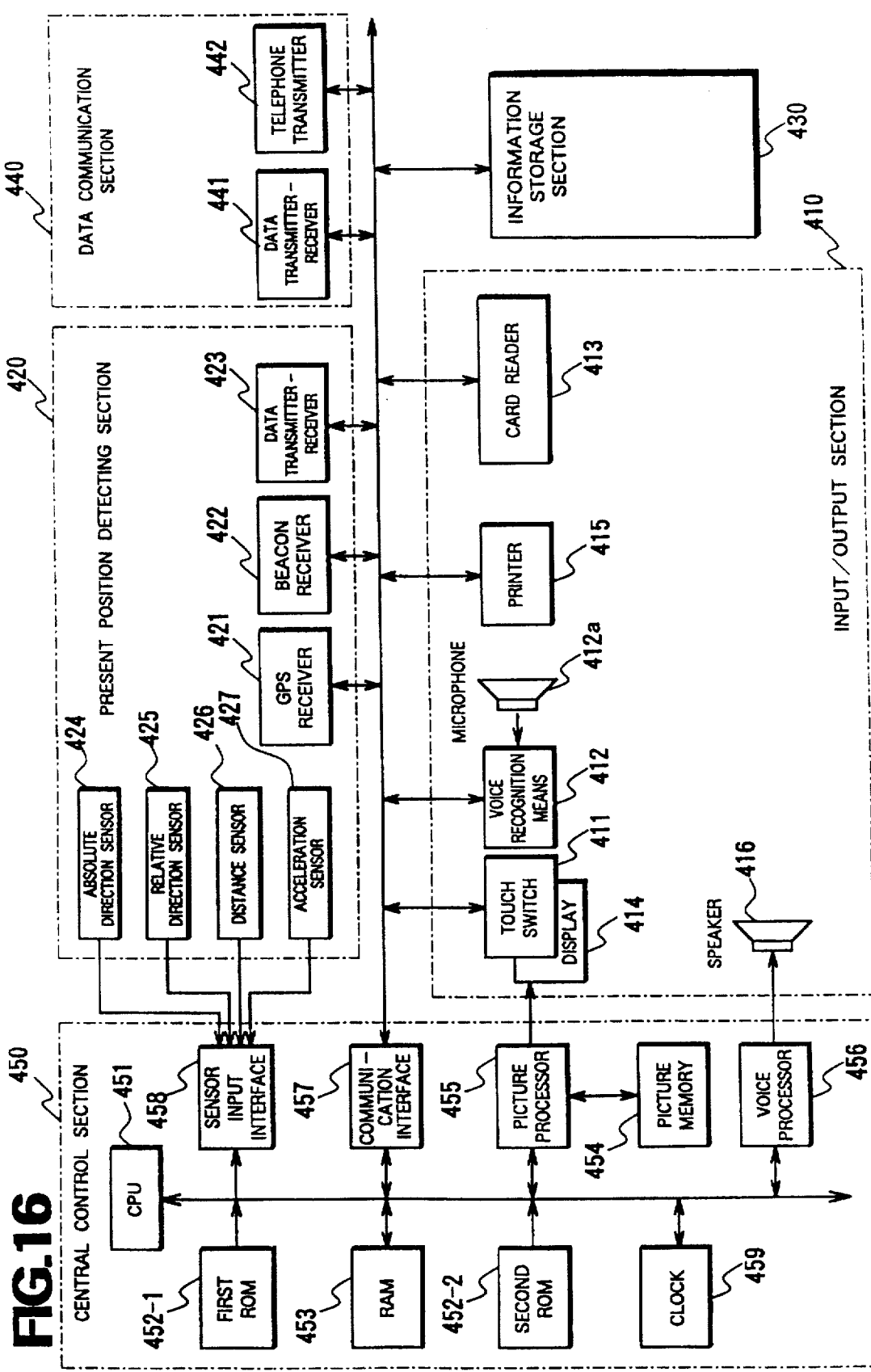
FIG. 16 is a block diagram showing individual units of the navigation system.
Figure 17:
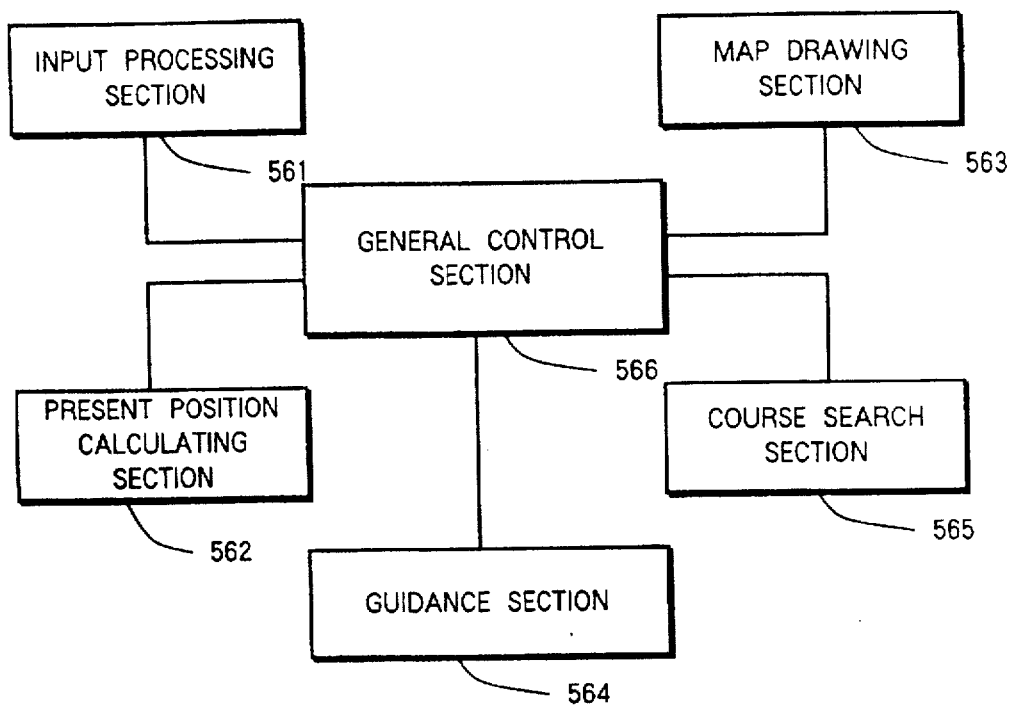
FIG. 17 is a block diagram of an example of the software system of the central control section.
Figure 18:
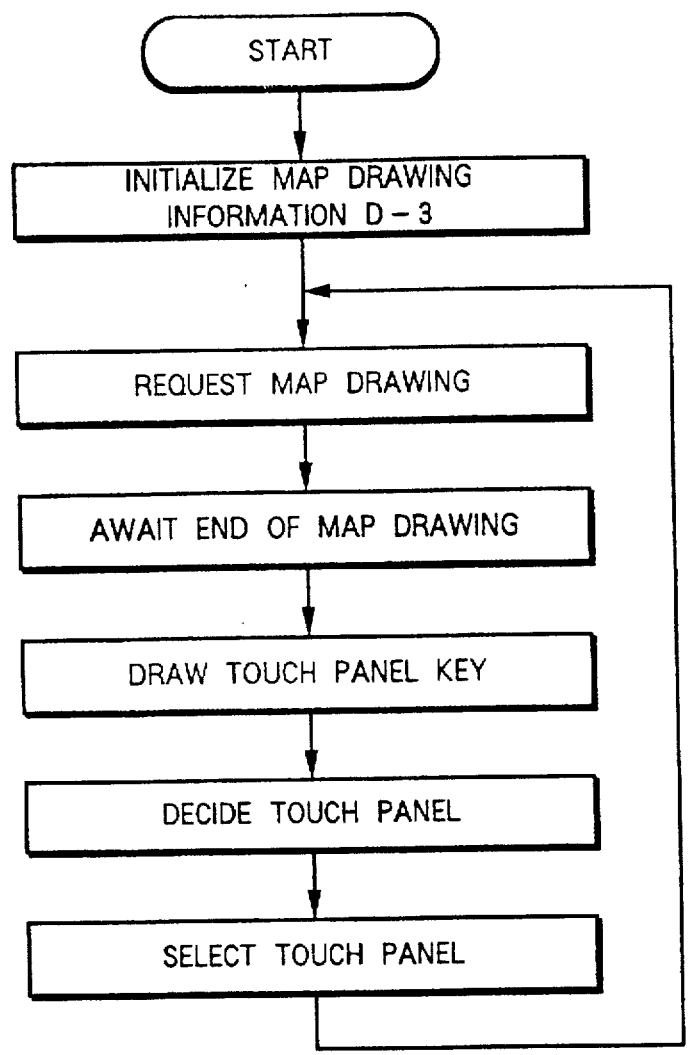
FIG. 18 is a flow chart of an input data processing routine.
Figure 19:
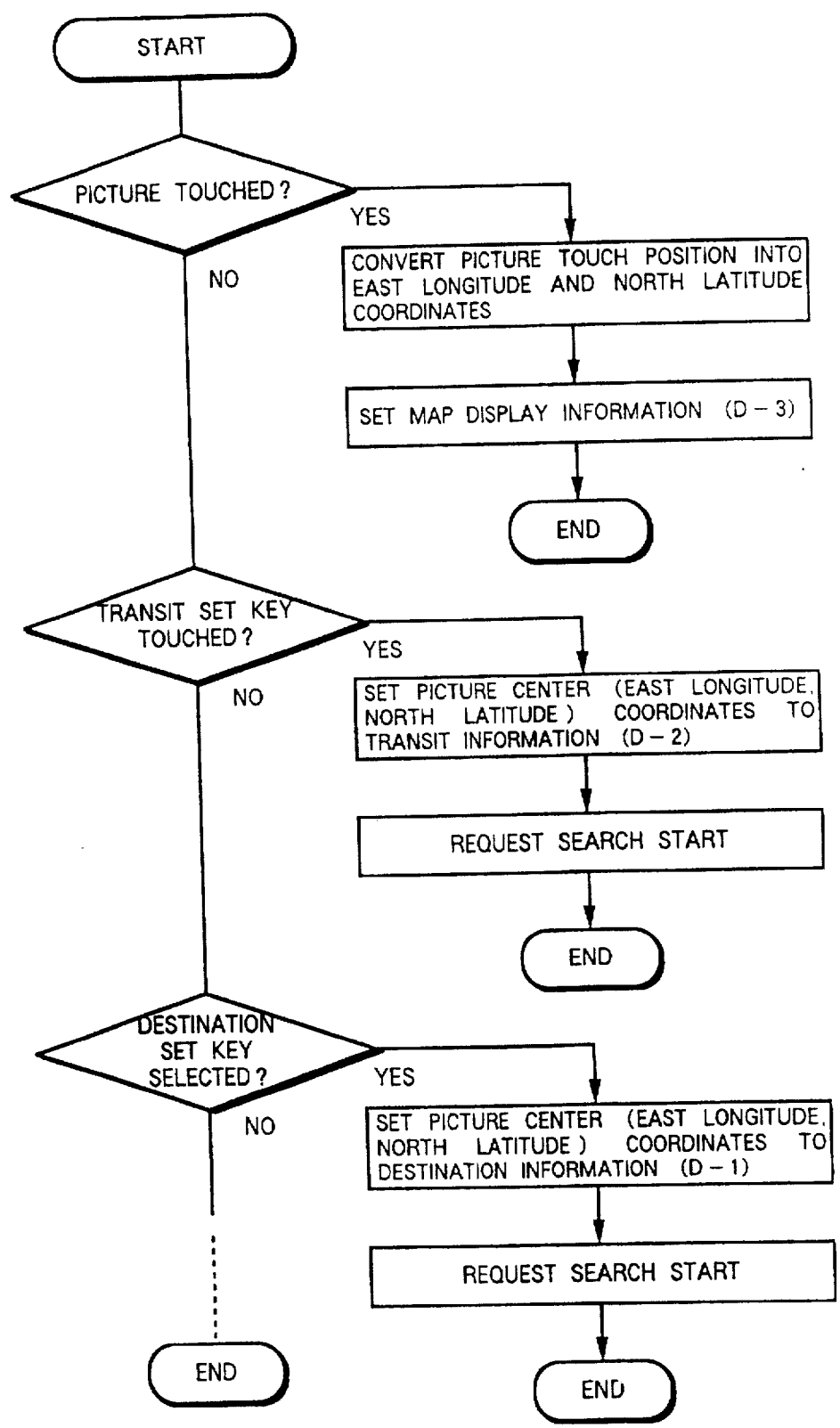
FIG. 19 is a flow chart of a touch panel selecting routine.

The construction of the individual components of the navigation system according to the present embodiment, the processing flow, and the transition of the pictures will now be described in more detail. FIG. 16 is a block diagram showing individual units of one example the navigation system; FIG. 17 is a block diagram showing an example of the construction of software used in a central control section; FIG. 18 is a flow chart for the processing routine of an input processing section; and FIG. 19 is a flow chart for processing a touch panel selection input.

The overall construction of the navigation system according to the present embodiment is shown in FIG. 16 as including an input/output section 410 for inputting and outputting the information for route guidance; a present position detecting section 420 for detecting information indicating the present position of the vehicle; an information storage section 430 stored with the navigation data necessary for calculating the route and the display guidance data necessary for the guidance; a data communication section 440 for transmitting and receiving the navigation data to and from a data source or sources such as a remote information center or electronic note and for telephone communications; and a central control section 450 for executing the route search and the display guidance necessary for the route guidance and for controlling the system as a whole. The terminology "electronic note" as used herein has reference to a device, such as a pocket calculator, having a memory functioning as an address book, a phone book, personal schedule, or the like.

In FIG. 16, the input/output section 410 has the following functions: to instruct the central control section 450 of the navigation processing in accordance with the will of the user so as to receive the destination input and to display voice and/or visual display guidance information as the driver requires; and to output the processed data and the communication data to the printer. As the means for realizing those functions, the input unit includes: a touch switch and/or touch panel (membrane switch) 411 for inputting the destination in terms of the telephone number or coordinates and for requesting the route guidance; a voice recognition means 412; and a card reader 413 for reading the data recorded in an IC card or magnetic card. The output unit includes: a display 414 for displaying the input data on the screen and for displaying the route guidance automatically on the screen in response to the request of the driver; a printer 415 for printing the data processed by the central control section 450, the data stored in the information storage section 430, and the communication data received from the information center; and a speaker 416 for voice output of the route guidance.

The display 414 includes a color CRT or color liquid crystal display for displaying in colors all the diagrams and pictures necessary for the navigation such as a route setting display, an area section display or a node (e.g. intersection) display based upon the map data and/or the guidance data processed by the central control section 450 and for displaying the keys, e.g. for setting the route guidance and for switching the displays. Especially, information on a node to be passed such as the name of the node to be passed temporarily pops up in colors as the area section display.

The display screen is mounted in the instrument panel in the vicinity of the driver's seat and enables the driver to confirm the present position of his vehicle by observing the section diagram and to acquire information on the route to be followed. Moreover, the display 414 is combined with the touch panel 411 which provides function keys so that the aforementioned operations may be executed on the basis of the signals input by touching the keys. The input signal generating means which includes those keys on touch panel constitutes the input unit, although its detailed description is omitted here.

The voice recognition means 412 constitutes an input signal generating means for generating signals to be processed by the central control section 450, in accordance with coordinate information input by voice of the user through a microphone 412a.

The present position detecting section 420 includes: a GPS receiver 421 making use of the global positioning system (GPS); a beacon receiver 422; a data transmitter-receiver 423 for receiving the correcting signal of the GPS via a cellular phone or FM multiple signals; an absolute direction sensor 424 in the form of, for example, a geomagnetic sensor; a relative direction sensor 425, for example, a wheel sensor or a steering sensor; a distance sensor 426 for detecting the travel distance by sensing the number of revolutions of the wheels; and an acceleration sensor 427.

The information storage section 430 is a data base having stored therein: the map data, the intersection data, the node data, the road data, the photographic data, the destination data, the guidance point data, the detailed destination data, the road name data, the branching point data, the address data, the display guidance data and the voice guidance data, all of which are necessary for the route guidance; and the destination information, the transit information and the map display information, as shown in FIG. 14.

The data communication section 440 includes: a data transmitter-receiver 441 for transmitting and receiving the data to and from the remote (external) information center, in response to the request of the user, and for transmitting and receiving the data to input the point coordinates by using the destination information which is stored in advance by the user in information storage media (i.e., the digital data storage means) such as an electronic note or IC card; and a telephone transmitter 442 for automatically communicating by telephone to acquire information as to an area around the periphery of a designated point and to communicate by telephone with the destination after the destination has been set.

The central control section 450 includes: a CPU 451 for executing the arithmetic operations; a first ROM 452-1 containing stored therein the program for processing route search, the program for controlling the display necessary for route guidance and the voice output necessary for voice guidance, and the data necessary for operating the programs; a RAM 453 for temporarily storing the coordinates of a set point, the guidance information for a searched route, and the data being used in arithmetic operations; a second ROM 452-2 containing stored therein the display information data necessary for the route guidance and the map display; a picture memory 454 stored with the picture data to be used for forming (drawing) the picture display; a picture processor 455 for fetching (retrieving) the picture data from the picture memory on the basis of the display control signal coming from the CPU 451 to form (draw) the picture and output the processed picture to the display; a voice processor 456 for synthesizing the voice as a phrase or sentence from sound data read out from the information storage section 430 on the basis of the voice output control signal of the CPU, by converting the synthesized information into an analog signal and outputting the analog signal to the speaker; a communication interface 457 for communicating the input/output data; a sensor input interface 458 for fetching (receiving) the sensor signal of the present position detecting section 420; and a clock 459 for posting the date and time as internal dialog information. Here, the route guidance is constructed such that the driver can select either the picture display or the voice output.

The software of the central control section 450 is constructed, as shown in FIG. 17, of: an input processing section 561 for processing the information which is input from the touch panel 411, from the voice recognizer 412 and from the card reader 413 of the input/output section 410; a present position calculating section 562 for calculating the present position of the vehicle on the basis of the signal inputted from the present position detecting section 420; a map drawing section 563 for drawing the map of the vicinity of the point searched at the predetermined reduced scale and azimuth; a guidance section 564 for providing the map, the section diagram and the node diagram, for providing information as to the remaining distance, for giving the name of and indicating leftward/rightward turns at a node at which the vehicle is to be turned, for teaching route characteristics, for giving voice guidance and for displaying the route on the map for the guidance; a course search section 565 for searching the course (route searching), on the basis of the inputs of the starting point or the present position, the destination, and the transit, to set the route; and a general control section 566 for controlling the aforementioned sections.

The routine executed by the input processing section 561 in case a map is to be drawn for input of a point is shown in FIG. 18. The first step involves initially setting the reference coordinates, reduced scale and azimuth to be drawn on the picture. In the second step a map drawing request is issued to the map drawing section 563 through the general control section. Then, the map drawing by the map drawing section 563 is awaited, and the touch panel key is drawn to provide for input through the touch panel. When an input is made through the touch panel, the touch panel selection is executed. The touch panel is selected by deciding whether or not the picture is touched, whether or not the transit set key is touched, and whether or not the destination set key is selected, as shown in FIG. 19. If the picture has been touched the touch position on the picture is converted into the east longitude and north latitude coordinates to set the map display information D-3. If the transit set key has been selected the picture touch position is converted into the east longitude and north latitude coordinates to set the map display information D-3. Moreover, if the transit set key has been selected, the picture center (north latitude, east longitude) coordinates are set as the transit information D-2. If the destination set key selected, the picture center (north latitude, east longitude) coordinates are set as the destination information D-2 to issue the search start request.

Next will be described the picture transition and the map change at the time of point setting with reference to FIGS. 20(a)–27.

Figure 20:
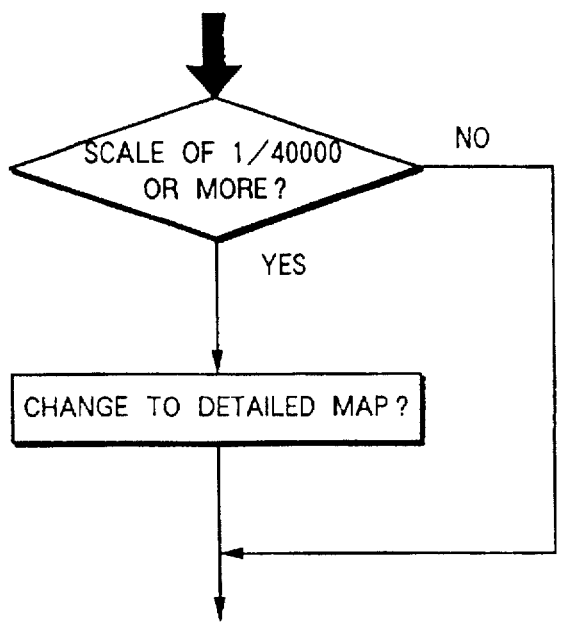
FIGS. 20(a) and 20(b) are diagrams illustrating an example of a destination setting display.
Figure 20:
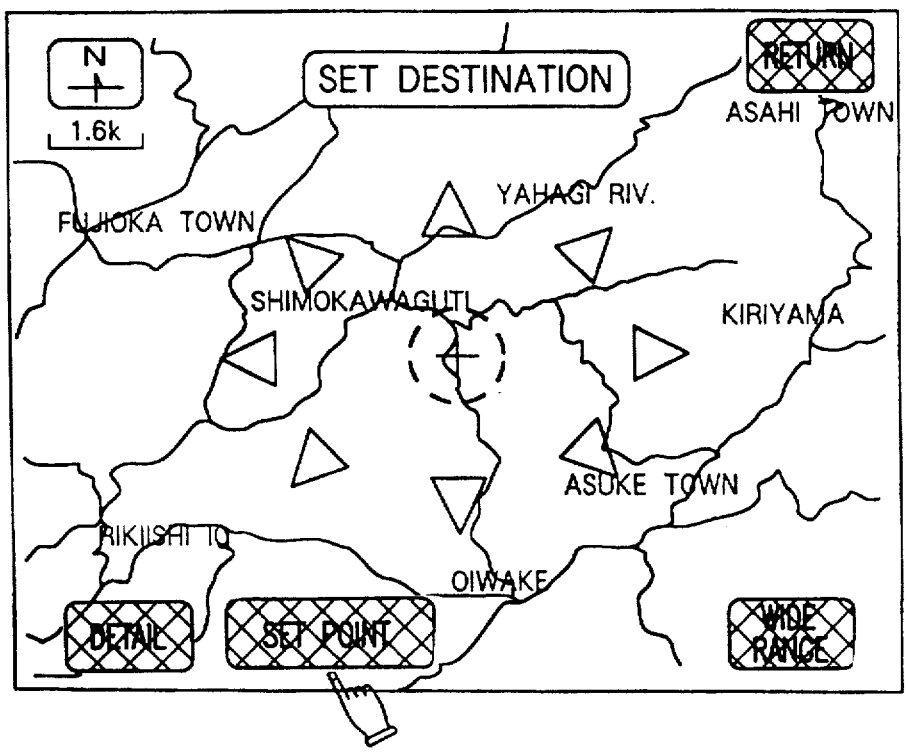

When the destination setting or transit setting switch is touched in the picture displayed by indexing the map, as shown in FIG. 15 (b), it is decided, as shown in FIG. 20 (a), whether or not the scale of the map being displayed covers a wide area of 1/40000 or more. If the scale is of the wide area, the map is changed to a more detailed map, and an eight-direction cursor is displayed for the fine adjustment, as shown in FIG. 20 (b). If positioning is required, the eight-direction cursor is operated to bring the cross mark to a predetermined position. Then, the destination or transit setting process is ended by touching the point setting switch.

Figure 21:
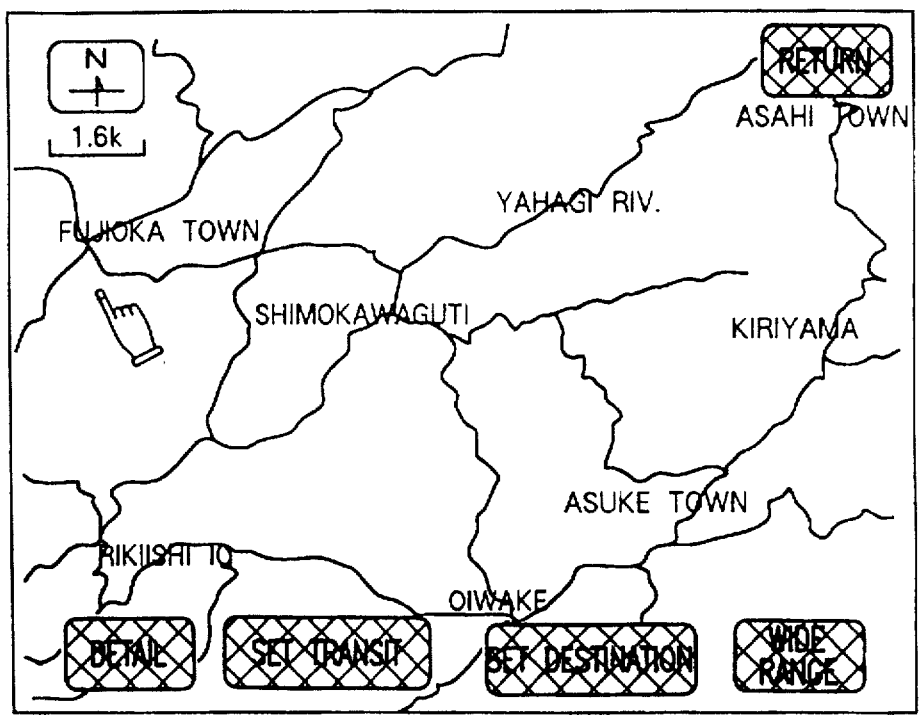
FIGS. 21(a) and 21(b) are diagrams illustrating an example of display scrolling.
Figure 21:
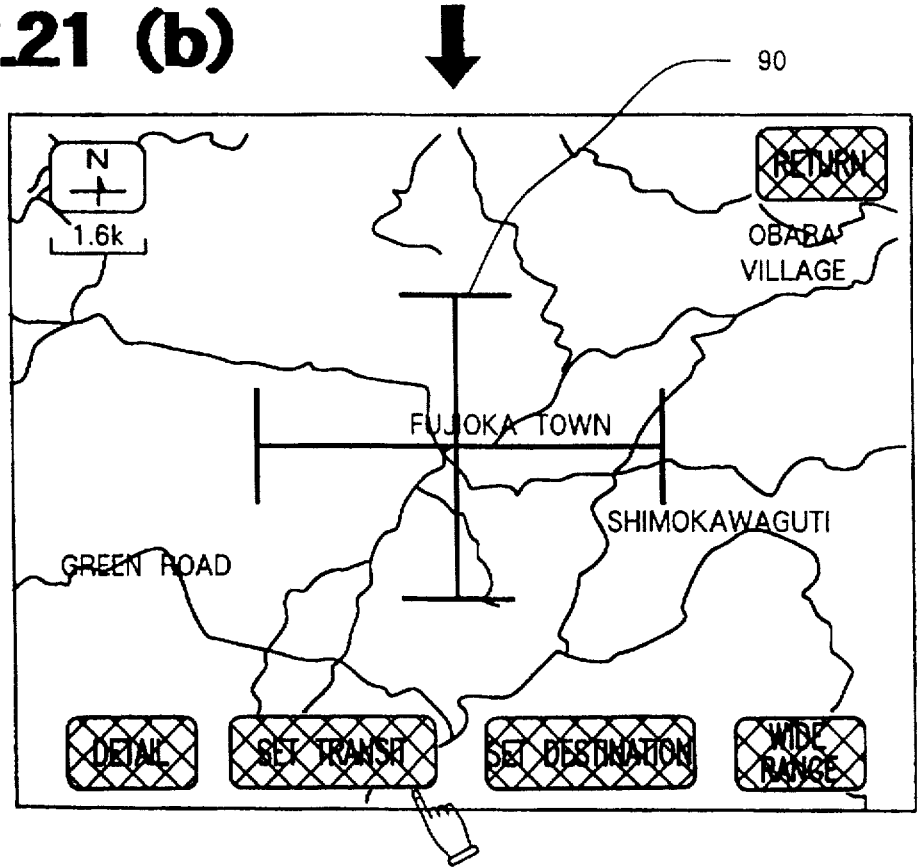
Figure 22:
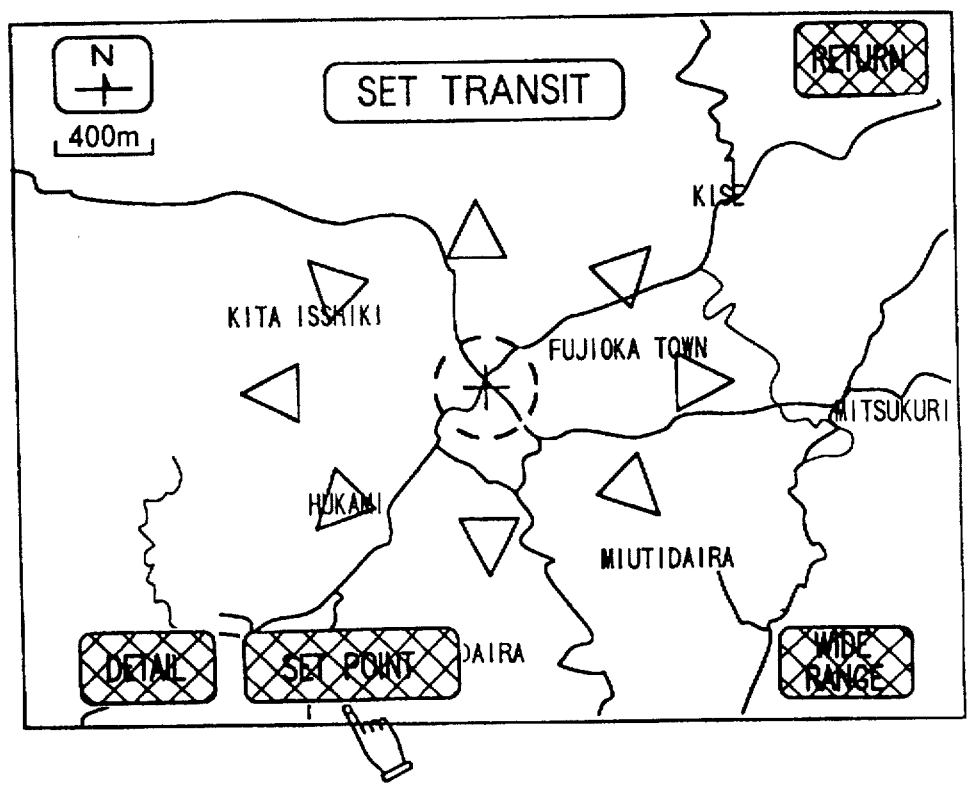
FIG. 22 is a diagram illustrating an example of transit setting.

On the other hand, if an arbitrary position on the display map is to be moved to the center, it is touched, as shown in FIG. 21 (a). Then, the picture is scrolled to display the touched position in the center, as shown in FIG. 21 (b). When the transit setting switch is touched, a decision is made as to whether or not the map covers the wide area, i.e. to switch the display to the detailed map, as has been described with reference to FIG. 20. Then, the transit setting is ended by touching the point setting switch, as shown in FIG. 22. As shown in FIG. 21(b) a frame 90, indicating the range, is displayed on an enlarged scale when a point setting switch, such as the transit setting switch or the destination setting switch, is depressed.

If the transit is to be set during route guidance, as shown in FIG. 23(a), the picture is scrolled to the area around the touched position, as shown in FIG. 23 (b). When the transit setting switch is touched, the transit can be set as in FIG. 22.

Figure 26:
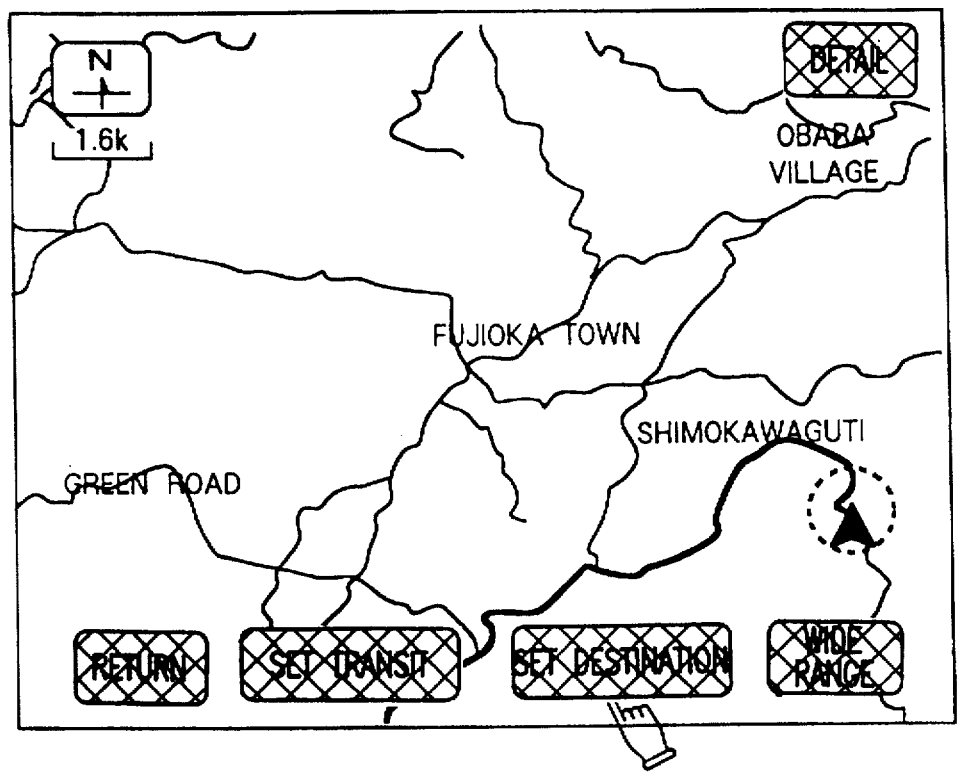
FIG. 26 is a diagram illustrating destination setting.
Figure 27:
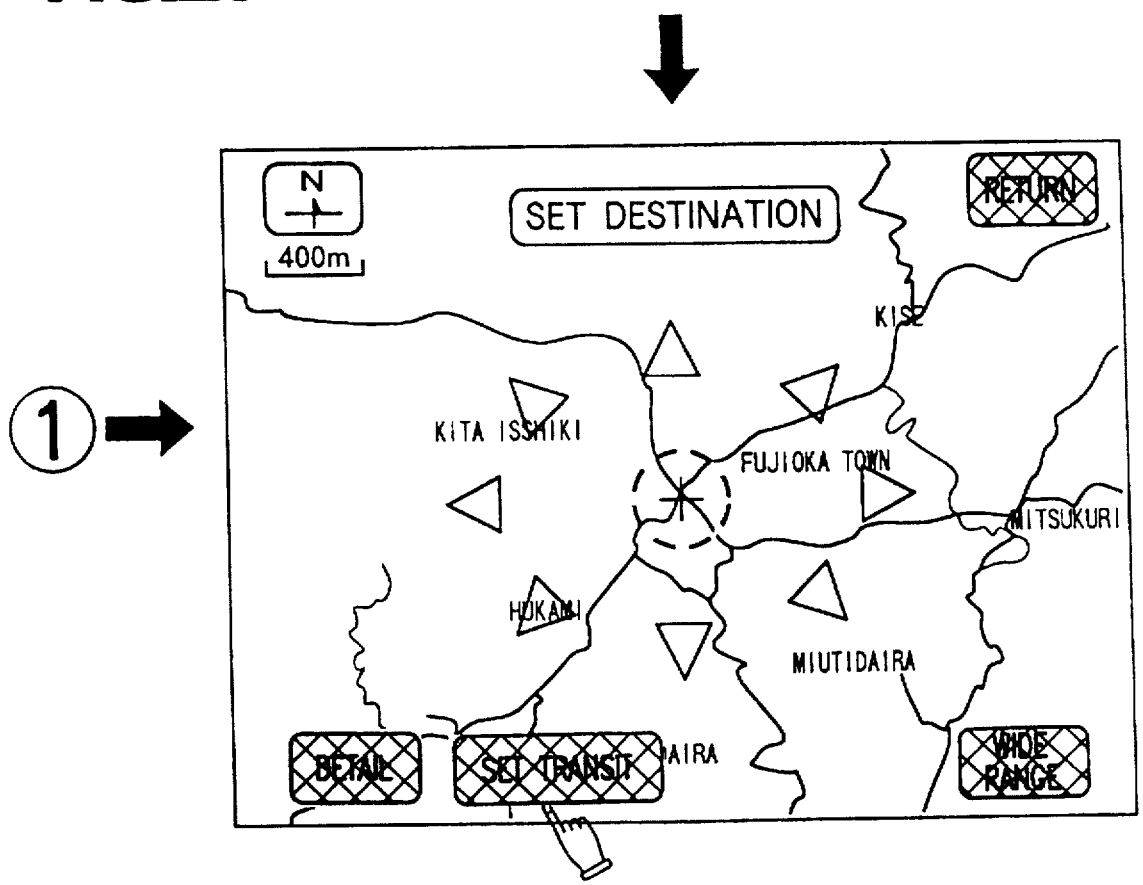
FIG. 27 is a diagram illustrating point setting for a destination.

To set a point, e.g. destination, by input of a telephone number, the "INDEX TEL. NO." is touched in the menu picture shown in FIG. 24 (a). Then, the display for inputting the telephone number, as shown in FIG. 24(b), is presented, and the ten keys are touched to input the telephone number. If the telephone number input is not registered to memory, a map corresponding to the area for the toll/local exchange number of the inputted telephone number is displayed, as shown in FIG. 25 (b). When the vicinity of Fujioka Town, for example, is touched, the picture is scrolled to display that area of the map around Fujioka Town, as shown in FIG. 26. When the destination setting switch is then touched, the decision routine of FIG. 20 (a) is executed to display the eight-direction cursor and the cross mark for fine adjustment, as shown in FIG. 27. Then, the position, which is indicated by the cross mark when the point setting switch is touched, is set as the destination. On the other hand, if the inputted telephone number is registered in memory, the picture shown in FIG. 27 is instantly displayed.

Next will be described the change to the detailed map with reference to FIGS. 28–32.

Figure 28:
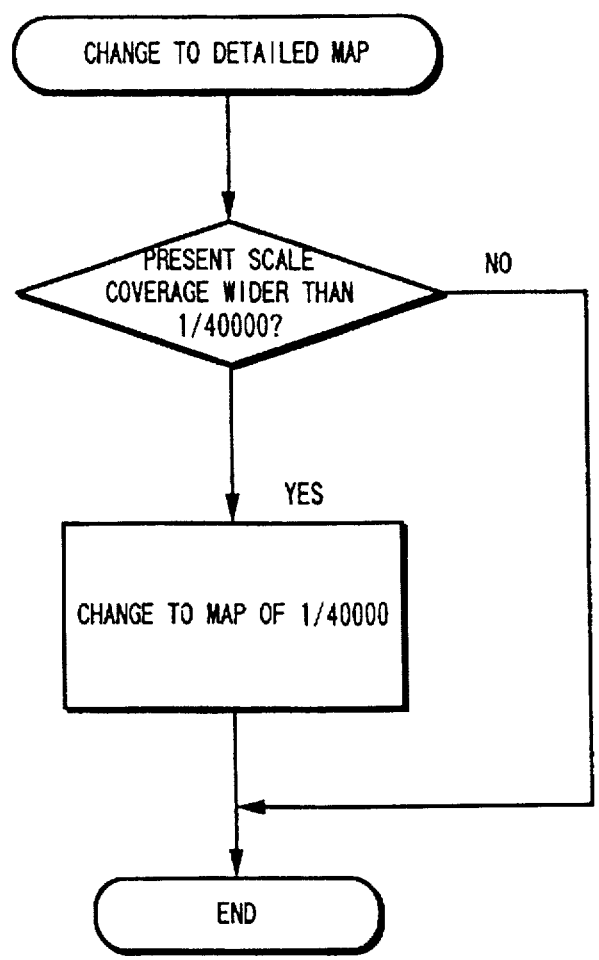
FIG. 28 is a flow chart of a routine for changing to a map of a scale of 1/40000.

Since, for point setting case, the map capable of recognizing a point with acceptable accuracy has a scale of 1/40000, the map having the scale of 1/40000 is adopted as the detailed map in the present embodiment. The routine for changing to the detailed map, therefore, first decides, as shown in FIG. 28, whether or not the coverage of the present scale is wider than the map of 1/40000. If the answer is YES, the picture is changed to the map of 1/40000.

Figure 29:
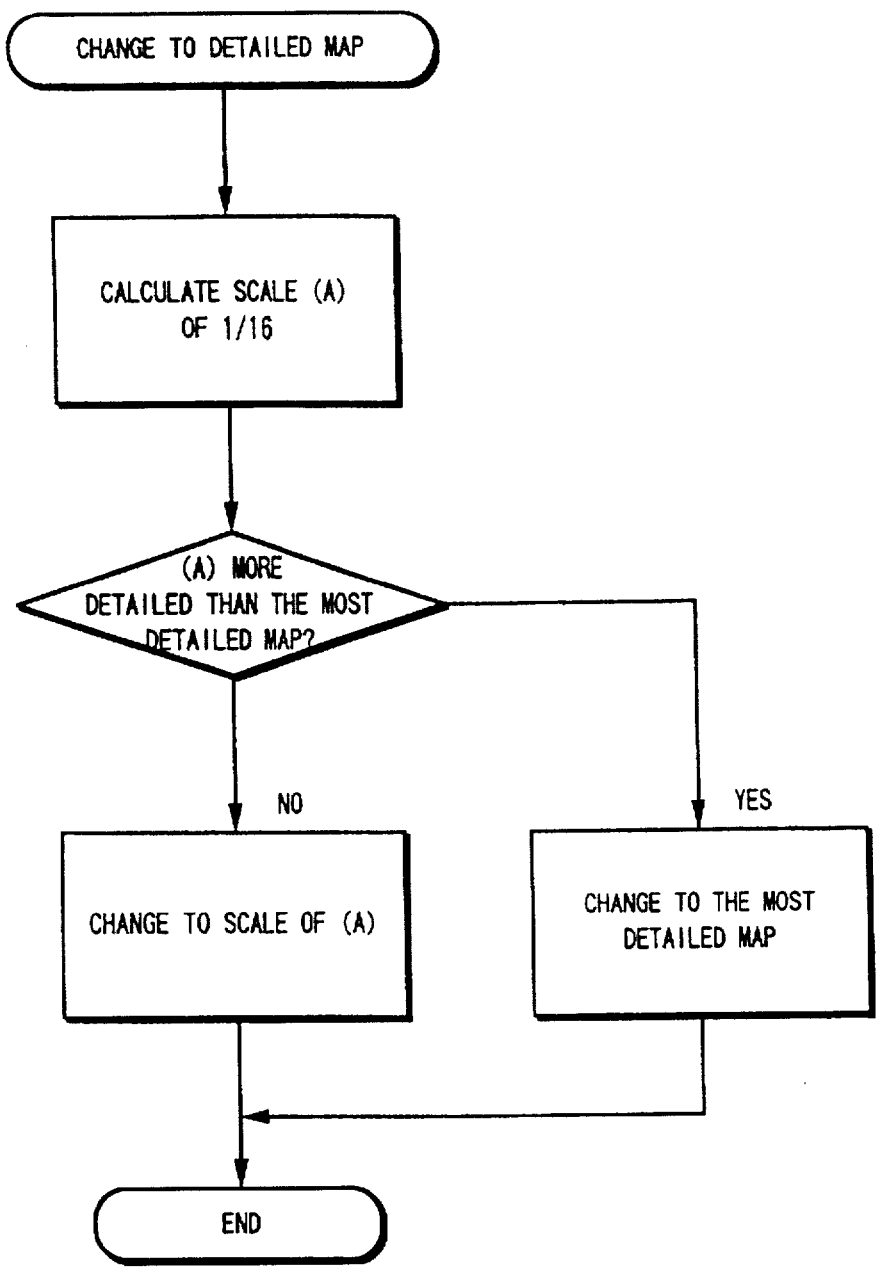
FIG. 29 is a flow chart of a routine for changing to a detailed map of a scale of 1/40000.
Figure 30:
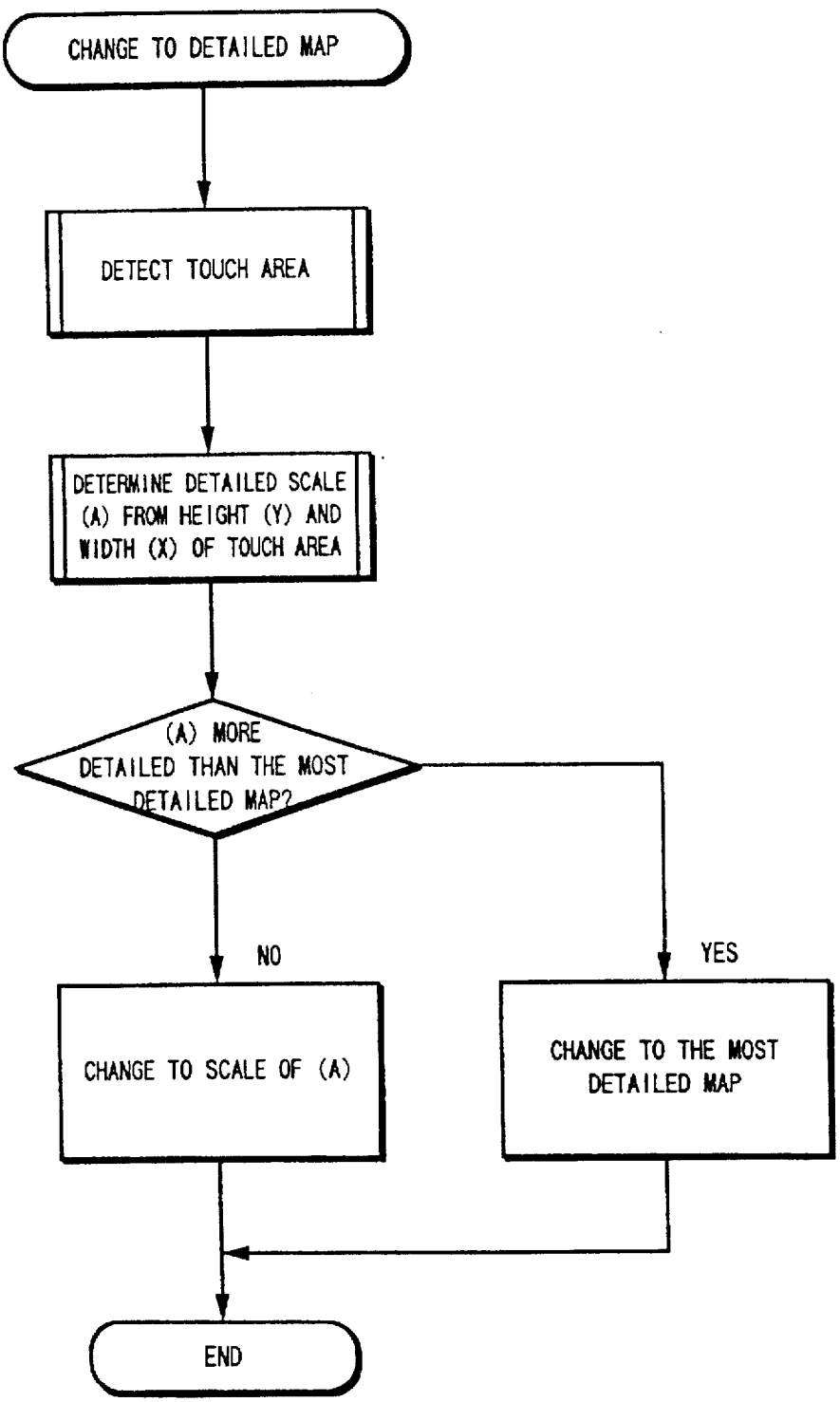
FIG. 30 is a flow chart for a routine for displaying a detailed map containing a touched area.

As the detailed scale containing the touched point, moreover, a detailed scale A of 1/16 is calculated, as shown in FIG. 29, and a determination is made as to whether or not it is more detailed than the most detailed map, so that the map is changed to the scale A within the range of the most detailed map. The change to the detailed map containing the touched area is executed by detecting the touch area, as shown in FIG. 30, to determine the detailed scale A from the height Y and the width X of the touch area. If the scale A is not more detailed than the most detailed one, the map is changed to the scale A within the range of the most detailed one.

Figure 32A:
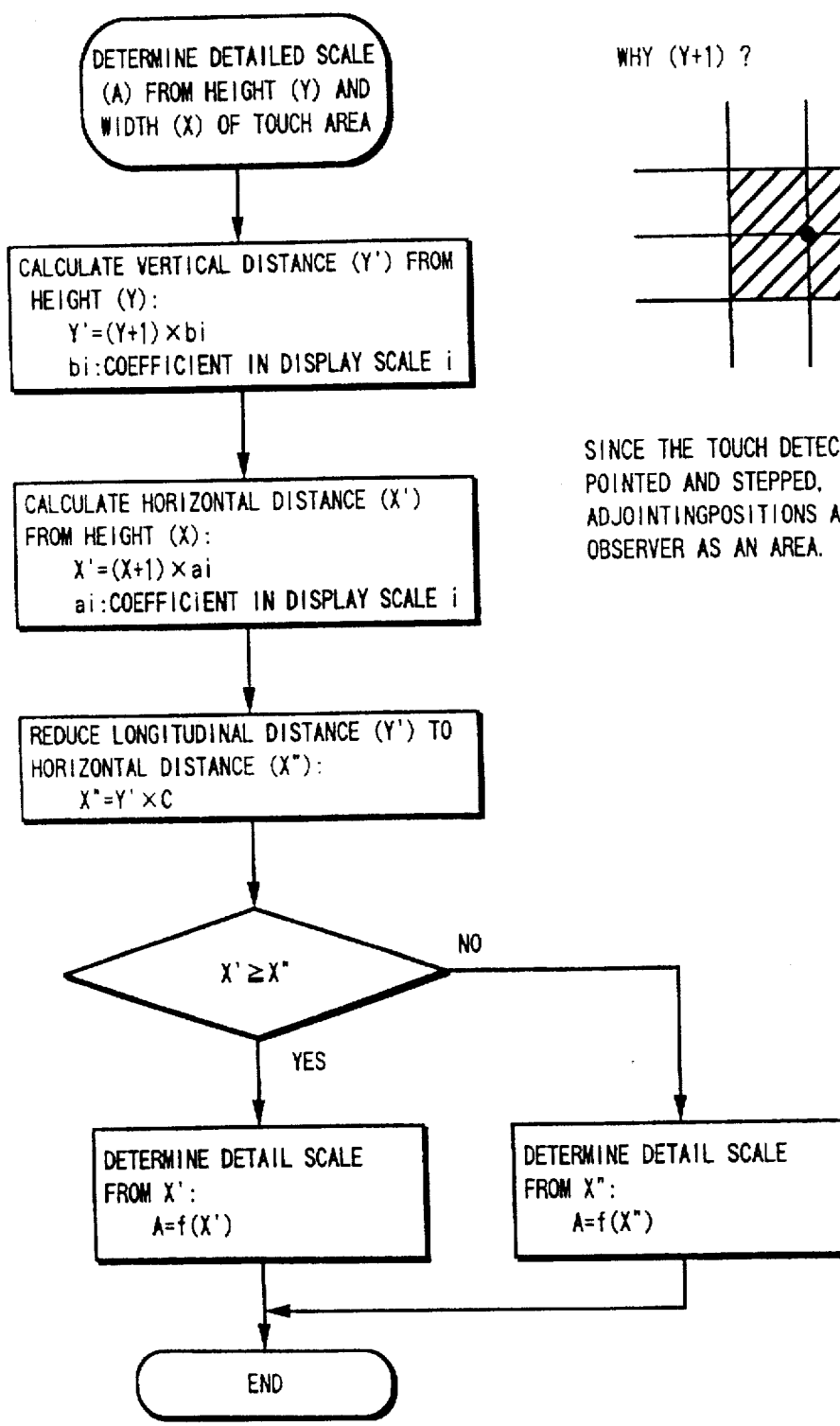
FIG. 32(a) is a flow diagram of a detailed scale deciding routine.
Figure 32B:
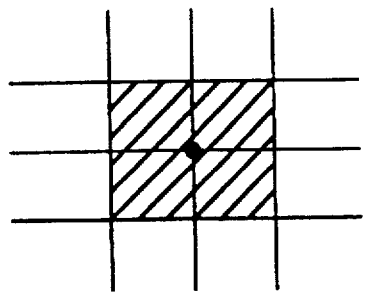
FIG. 32(b) is a graph of detail area displayed as a result of the determined detail scale.

To determine the touch area, the horizontal and vertical touch data are acquired as individual values, as shown in FIG. 31. For determining the detailed scale, moreover, the vertical distance $Y'=(Y+1) \times bi$ and the horizontal distance $X'=(X+1) \times ai$ are calculated, as shown in FIG. 32, Wherein ai and bi indicate coefficients in the display scale i. Next, the vertical distance Y' is reduced to the horizontal distance $S''=Y' \times C$, and the horizontal distance X' and the reduced distance X'' are compared. If $X' \geq X''$, the detailed scale $A=f(X')$ is determined from X'. Otherwise, the detailed scale $A=F(X'')$ is determined from X''. The reason why "+1" is included in the calculation of the distances Y' and X' is to include the two adjacent adjoining positions within the area, because the touch detect position is pointed and stepped.

Figure 33:
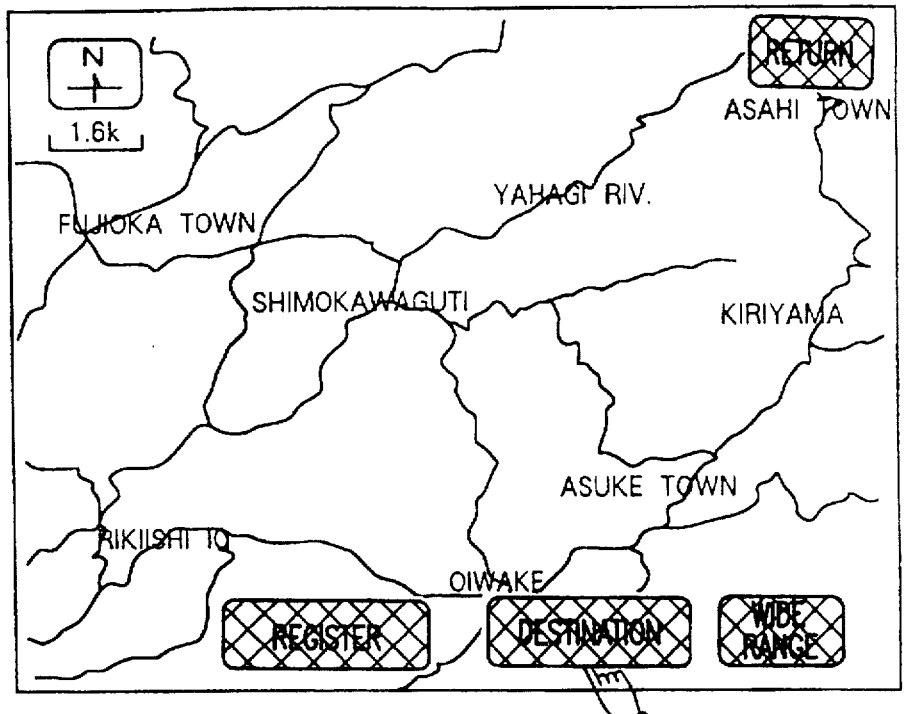
FIGS. 33(a) and (b) show inputting of a point, using the display screen, in the navigation system of the prior art.
Figure 33:
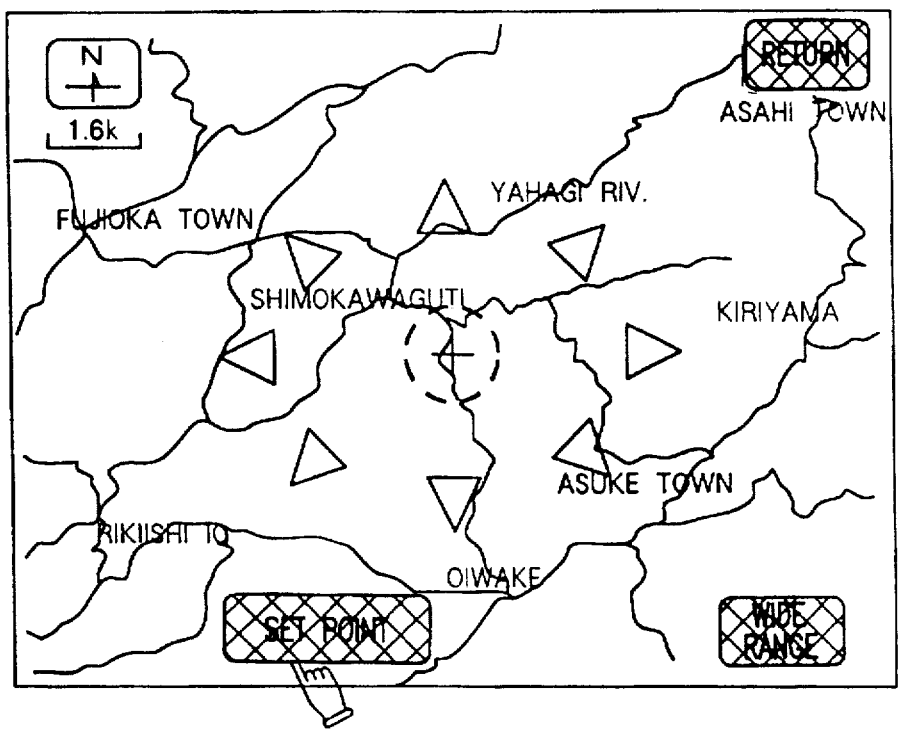

FIG. 33 presents diagrams showing the construction of the navigation system of the prior art. The second embodiment of the present invention will be compared with prior art.

In the navigation system of the prior art shown in FIG. 33, the map covering the vicinity of a desired area can be read out and displayed by indexing the point in the menu picture to register the desired point and set the destination. If the desired point to be set is the destination, for example, the destination switch on the map picture of FIG. 33 (a), as displayed at first by indexing the place name, is touched (or operated). As a result of this operation, the map is changed to the destination setting picture, in which are displayed the first displayed map, the cross mark and the point set key for setting the point, and the eight-direction cursor for fine adjustment. Since the cross mark is displayed at the center of the picture, the eight-direction cursor is used to scroll the picture selectively in one of the eight directions to thereby move the point to be set, such as the destination, to the center of the displayed picture, i.e., the position of the cross mark. By touching the point setting key, moreover, the point of the cross mark is set as the destination. On the other hand, if the selected point is to be set as a registered point, the register key is also touched to register the point of the cross mark.

According to the setting method of the prior art described above, however, a destination point may be too small to observe when a desired point is to be set as the destination, if the scale of the displayed map covers a wide area. This creates the problem that it is not easy to scroll the picture by using the eight-direction cursor to thereby register the point to be set accurately to the cross mark. Especially, the vehicular navigation system has the problem that the display or the display unit mounted on the vehicle has a screen size as small as about six inches and is mounted in the center console of the vehicle so that it is hard to observe by the driver. Moreover, if the first displayed map in the display unit fails to contain the desired point, the direction the map is to be scrolled in, so as to find the desired point, may be unknown. In this case, too, the picture has to be scrolled by using the eight-direction cursor to move the desired point to be set to the center of the displayed picture. As a result, the amount of scrolling using the eight-direction cursor for the fine adjustment is so large as to create the problem that the setting takes a long time.

However, the foregoing embodiment of the present invention can solve the above-specified problems and provide a navigation system which can input a point such as a destination or easily change a displayed map.

Specifically, the foregoing embodiment includes: the data storage section 101 having stored map data including the information for drawing maps at a plurality of reduced scales; the display 102 which serves as a display means for displaying the map in an arbitrary scale; the input section 103 which serves as the input means for selecting and inputting a key or point displayed in the display 102; and the data processor 105 for displaying the map in the display means by reading out the map data stored in the aforementioned data storage section 101 and for displaying the detailed map by changing to a predetermined reduced scale on the condition that an instruction for setting the point is issued by the aforementioned input section 103. The detailed map is displayed by scrolling or changing the reduced scale of the map which is displayed in the aforementioned display 102, responsive to instructing and inputting of the display picture by the aforementioned input section 103, so that the point can be promptly inputted by a simple operation to set the destination or transit easily, even during running.

Moreover, the data processor 105, which constitutes the display control means: scrolls the point on the map, selected by operation of the aforementioned input section 103, to approximately the center of the picture of the display 102, changes the reduced scale to a predetermined scale and displays the map data, responsive to an instruction to set the point from the aforementioned input section 103; and displays the range to be changed on the map responsive to an instruction to set the point from the aforementioned input section 103. As a result, the scrolling of the map to the point inputted and the change to the detailed map can be easily accomplished, thereby improving the accuracy of the point inputting. Moreover, the scale is changed to one for displaying the designated area in the detailed map, and the map being displayed is changed to that of a predetermined scale, so that an easily read map can be displayed for inputting the point.

Incidentally, the present invention is not be limited to the foregoing embodiments but can be modified in various manners. In the foregoing embodiments, for example, when the map is changed to the detailed map, it is decided whether or not the map is wider than that having the scale of 1/40000. The reference point may be a more detailed map, and the scale of 1/16 may be changed to the scale of 1/8. Moreover, while the present embodiment has been described as having an input means exemplified by the touch panel, a controller may be used to designate and input the key or point which is displayed on the display screen.

What is claimed is:

1. A vehicular information display system comprising:
   display means mounted on a vehicle and having a display screen for presenting a picture of a plurality of input keys inclusive of a first group of running-inoperable input keys which are operable only when the vehicle is stopped and a second group of running operable keys;
   run/stop deciding means for deciding whether the vehicle is running or stopped and for generating a first decision signal;
   display color control means, responsive to the first decision signal of said run/stop deciding means, for selecting and changing colors of predetermined picture elements including said first group of keys of the picture of said display means between one color for running and a different color for stop such that, during running of the vehicle, said first and second groups of keys are displayed in different colors to distinguish the keys of the first group from the keys of the second group;
   input means for inputting selection of one of said plurality of keys and corresponding instructions for the picture;
   picture transition control means for controlling a change of the picture in accordance with the selection and instructions from said input means; and
   picture drawing means for drawing the picture, which is controlled by said picture transition control means, in the colors of the picture elements as selected and changed by said display color control means.

2. A vehicular information display system according to claim 1, further comprising:
   daytime/nighttime deciding means for distinguishing between daytime and nighttime and for generating a second decision signal;
   wherein said display color control means changes the colors of the individual picture elements in accordance with said first and second decision signals.

3. A vehicular information display system according to claim 1, wherein said display color control means includes a plurality of color pallets which are selected and changed in accordance with the first decision signal of said run/stop deciding means.

4. A vehicular information display system according to claim 1, wherein said input means includes a touch panel combined with the display screen of said display means.

5. A vehicular information display system according to claim 1, wherein said picture transition control means decides whether or not the instruction of said input means is permitted in the case the vehicle is running and displays an input-inoperable message in the case where the input is not permitted.

6. A vehicular information display system according to claim 1 wherein said display color control means causes said display means to display all input keys of said plurality of input keys in the same color responsive to a decision that the vehicle is stopped.

* * * * *